(12) United States Patent
FitzGerald et al.

(10) Patent No.: US 11,317,175 B2
(45) Date of Patent: Apr. 26, 2022

(54) GATHERING RESEARCH DATA

(71) Applicant: The Nielsen Company (US), LLC, New York, NY (US)

(72) Inventors: Joan G. FitzGerald, Arlington, VA (US); Carol J. Frost, Woodstock, MD (US); Eugene L. Flanagan, Wilton, CT (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 351 days.

(21) Appl. No.: 16/267,355

(22) Filed: Feb. 4, 2019

(65) Prior Publication Data

US 2019/0174209 A1 Jun. 6, 2019

Related U.S. Application Data

(63) Continuation of application No. 14/804,901, filed on Jul. 21, 2015, now Pat. No. 10,200,769, which is a continuation of application No. 12/246,225, filed on Oct. 6, 2008, now Pat. No. 9,124,378.

(60) Provisional application No. 60/978,117, filed on Oct. 6, 2007.

(51) Int. Cl.
*G06F 16/60* (2019.01)
*H04Q 9/00* (2006.01)
(Continued)

(52) U.S. Cl.
CPC .............. *H04Q 9/00* (2013.01); *G06F 16/60* (2019.01); *G06Q 30/02* (2013.01); *H04H 60/31* (2013.01);
(Continued)

(58) Field of Classification Search
CPC ................................ H04H 60/31; G06F 16/60
(Continued)

(56) References Cited

U.S. PATENT DOCUMENTS 5,319,735 A 6/1994 Preuss et al.
5,450,490 A 9/1995 Jensen et al.
(Continued)

FOREIGN PATENT DOCUMENTS

AU 2008308442 4/2009
AU 2015202027 5/2015
(Continued)

OTHER PUBLICATIONS

IP Australia, "Notice of Acceptance", issued in connection with AU patent application 2019201945, dated Feb. 4, 2021, (3 pages).
(Continued)

*Primary Examiner* — Kimberly L Wilson
(74) *Attorney, Agent, or Firm* — Hanley, Flight & Zimmerman, LLC

(57) ABSTRACT

Systems and methods for gathering research data using multiple monitoring devices are provided. The systems and methods include a processor to generate message data by supplementing first information collected by a first monitoring device with second information collected by a second monitoring device, the first information and the second information collected from media presented by a monitored device, and process the message data to determine a portion of the media that is encoded and a portion of the media that is unencoded. The example systems and methods also include a memory to store an indication that the message data is valid when the message data represents a code encoded in the media, and store data indicating the portion of the media that is encoded.

21 Claims, 13 Drawing Sheets

(51) Int. Cl.
  *G06Q 30/02* (2012.01)
  *H04H 60/31* (2008.01)
  *G10L 19/018* (2013.01)
(52) U.S. Cl.
  CPC ........ *G10L 19/018* (2013.01); *H04Q 2209/40* (2013.01)
(58) Field of Classification Search
  USPC .......................................................... 707/610
  See application file for complete search history.

(56) References Cited

U.S. PATENT DOCUMENTS

| | | | |
|---|---|---|---|
| 5,481,294 A | | 1/1996 | Thomas et al. |
| 5,574,962 A | | 11/1996 | Fardeau et al. |
| 5,579,124 A | * | 11/1996 | Aijala .................... H04H 20/31 386/201 |
| 5,581,800 A | | 12/1996 | Fardeau et al. |
| 5,687,191 A | | 11/1997 | Lee et al. |
| 5,737,025 A | | 4/1998 | Dougherty et al. |
| 5,764,763 A | | 6/1998 | Jensen et al. |
| 5,787,334 A | | 7/1998 | Fardeau et al. |
| 5,828,325 A | | 10/1998 | Wolosewicz et al. |
| 5,945,932 A | | 8/1999 | Smith et al. |
| 6,154,484 A | | 11/2000 | Lee et al. |
| 6,175,627 B1 | | 1/2001 | Petrovic et al. |
| 6,467,089 B1 | | 10/2002 | Aust et al. |
| 6,574,795 B1 | | 6/2003 | Carr |
| 6,845,360 B2 | | 1/2005 | Jensen et al. |
| 6,862,355 B2 | | 3/2005 | Kolessar et al. |
| 6,871,180 B1 | | 3/2005 | Neuhauser et al. |
| 7,117,513 B2 | | 10/2006 | Nelson |
| 7,266,566 B1 | | 9/2007 | Kennaley et al. |
| 9,124,378 B2 | | 9/2015 | FitzGerald et al. |
| 10,200,769 B2 | | 2/2019 | FitzGerald et al. |
| 2001/0053190 A1 | | 12/2001 | Srinivasan |
| 2002/0049687 A1 | | 4/2002 | Helsper et al. |
| 2003/0110485 A1 | | 6/2003 | Lu et al. |
| 2003/0122708 A1 | | 7/2003 | Percy et al. |
| 2003/0171833 A1 | | 9/2003 | Crystal et al. |
| 2004/0170381 A1 | | 9/2004 | Srinivasan |
| 2005/0200476 A1 | | 9/2005 | Forr et al. |
| 2005/0203798 A1 | | 9/2005 | Jensen et al. |
| 2005/0216509 A1 | | 9/2005 | Kolessar et al. |
| 2005/0243784 A1 | | 11/2005 | Fitzgerald et al. |
| 2005/0272018 A1 | | 12/2005 | Crystal et al. |
| 2007/0030824 A1 | | 2/2007 | Ribaudo et al. |
| 2007/0294705 A1 | | 12/2007 | Gopalakrishnan et al. |
| 2008/0091087 A1 | | 4/2008 | Neuhauser et al. |
| 2008/0101454 A1 | | 5/2008 | Luff et al. |
| 2008/0231462 A1 | | 9/2008 | Hobart |
| 2009/0007169 A1 | | 1/2009 | Headley et al. |
| 2009/0193052 A1 | | 7/2009 | FitzGerald et al. |
| 2015/0326954 A1 | | 11/2015 | FitzGerald et al. |

FOREIGN PATENT DOCUMENTS

| | | |
|---|---|---|
| AU | 2016253626 | 11/2016 |
| AU | 2019201945 | 4/2019 |
| CA | 2701717 | 4/2009 |
| EP | 2212775 | 8/2010 |
| WO | 2006014362 | 2/2006 |
| WO | 2006099612 | 9/2006 |
| WO | 2009046430 | 4/2009 |

OTHER PUBLICATIONS

IP Australia, "Notice of Acceptance for Patent Application," dated Dec. 11, 2018 in connection with Australian Patent Application No. 2016253626, 3 pages.
IP Australia, "Examination Report No. 1," dated Jan. 23, 2020 in connection with Australian Patent Application No. 2019201945, 5 pages.
IP Australia, "Patent Examination Report No. 1," issued in connection with Australian Patent Application No. 2008308442, dated Apr. 2, 2013, 4 pages.
IP Australia, "Notice of Acceptance," issued in connection with Australian Patent Application No. 2008308442, dated Jan. 5, 2015, 2 pages.
Canadian Intellectual Property Office, "Office Action," issued in connection with Canadian Patent Application No. 2,701,717, dated Feb. 28, 2014, 3 pages.
Canadian Intellectual Property Office, "Office Action," issued in connection with Canadian Patent Application No. 2,701,717, dated Mar. 31, 2015, 4 pages.
International Searching Authority, "International Search Report," issued in connection with International Patent Application No. PCT/US08/78962, dated Feb. 13, 2009, 3 pages.
United States Patent and Trademark Office, "Requirement for Restriction/Election," issued in connection with U.S. Appl. No. 12/246,225, dated Jul. 21, 2011, 6 pages.
United States Patent and Trademark Office, "Non-Final Office Action," issued in connection with U.S. Appl. No. 12/246,225, dated Nov. 1, 2011, 27 pages.
United States Patent and Trademark Office, "Final Office Action," issued in connection with U.S. Appl. No. 12/246,225, dated Jun. 11, 2012, 20 pages.
United States Patent and Trademark Office, "Non-Final Office Action," issued in connection with U.S. Appl. No. 12/246,225, dated Dec. 22, 2014, 29 pages.
United States Patent and Trademark Office, "Notice of Allowance," issued in connection with U.S. Appl. No. 12/246,225, dated Apr. 8, 2015, 24 pages.
United States Patent and Trademark Office, "Notice of Allowance," issued in connection with U.S. Appl. No. 12/246,225, dated May 8, 2015, 22 pages.
IP Australia, "Notice of Grant," issued in connection with Australian Patent Application No. 2008308442, dated May 7, 2015, 2 pages.
European Patent Office, "Communication pursuant to Article 94(3) EPC," issued in connection with European Patent Application No. 08836464.1, dated Mar. 18, 2016, 4 pages.
IP Australia, "Patent Examination Report No. 1," issued in connection with Australian Patent Application No. 2015202027, dated Apr. 4, 2016, 3 pages.
Canadian Intellectual Property Office, "Notice of Allowance," issued in connection with Canadian Patent Application No. 2,701,717, dated Apr. 19, 2016, 1 page.
IP Australia, "Patent Examination Report No. 2," issued in connection with Australian Patent Application No. 2008308442, dated Dec. 11, 2014, 3 pages.
European Patent Office, "Extended European Search Report," issued in connection with European Patent Application No. 08836464.1, dated Dec. 1, 2011, 12 pages.
IP Australia, "Notice of Acceptance," issued in connection with Application No. 2015202027, dated Jul. 25, 2016, 2 pages.
IP Australia, "Notice of Grant," issued in connection with Application No. 2015202027, dated Nov. 24, 2016, 1 page.
IP Australia, "Examination report No. 1," issued in connection with Application No. 22016253626, dated Dec. 14, 2017, 3 pages.
United States Patent and Trademark Office, "Non-Final Office Action," issued in connection with U.S. Appl. No. 114/804,901, dated Feb. 3, 2016, 37 pages.
United States Patent and Trademark Office, "Final Office Action," issued in connection with U.S. Appl. No. 114/804,901, dated Aug. 12, 2016, 42 pages.
United States Patent and Trademark Office, "Non-Final Office Action," issued in connection with U.S. Appl. No. 114/804,901, dated Nov. 16, 2017, 39 pages.
United States Patent and Trademark Office, "Final Office Action," issued in connection with U.S. Appl. No. 114/804,901, dated Jun. 22, 2018, 19 pages.
United States Patent and Trademark Office, "Notice of Allowance and Fee(s) Due," issued in connection with U.S. Appl. No. 114/804,901, dated Sep. 24, 2018, 16 pages.

(56) References Cited

OTHER PUBLICATIONS

IP Australia, "Certificate of Grant," Issued in connection with Australian Patent Application No. 2019201945, dated Jun. 3, 2021, 1 page.

IP Australia, "Notice of grant for patent," Issued in connection with Australian Patent Application No. 2019201945, dated Jun. 3, 2021, 1 page.

IP Australia, "Examination Report No. 2," Issued in connection with Australian Patent Application No. 2016253626, dated Aug. 16, 2018, 4 pages.

International Searching Authority, "International Preliminary Report on Patentabilty," Issued in connection with International Patent Application No. PCT/US2008/078962, dated Apr. 7, 2010, 9 pages.

The Manchester 300, "Out of the Lab and into the Field—A Report on the Extended Field Test of Arbitron's Portable People Meter in Manchester, England," Arbitron, dated Jan. 1, 2000, 25 pages.

International Searching Authority, "Written Opinion," Issued in connection with International Patent Application No. PCT/US2008/078962, dated Feb. 13, 2009, 8 pages.

U.S. Appl. No. 60/857,714, "Research Data Gathering with a Portable Monitor and Stationary Device," filed Nov. 7, 2006, 51 pages.

Bender et al. "Techniques for data hiding," IBM Systems Journal, vol. 35, Nos. 3 & 4, 1996, 24 pages.

Walker, "Audio watermarking," R&D White Paper, British Broadcasting Corporation, Aug. 2004, 18 pages.

\* cited by examiner

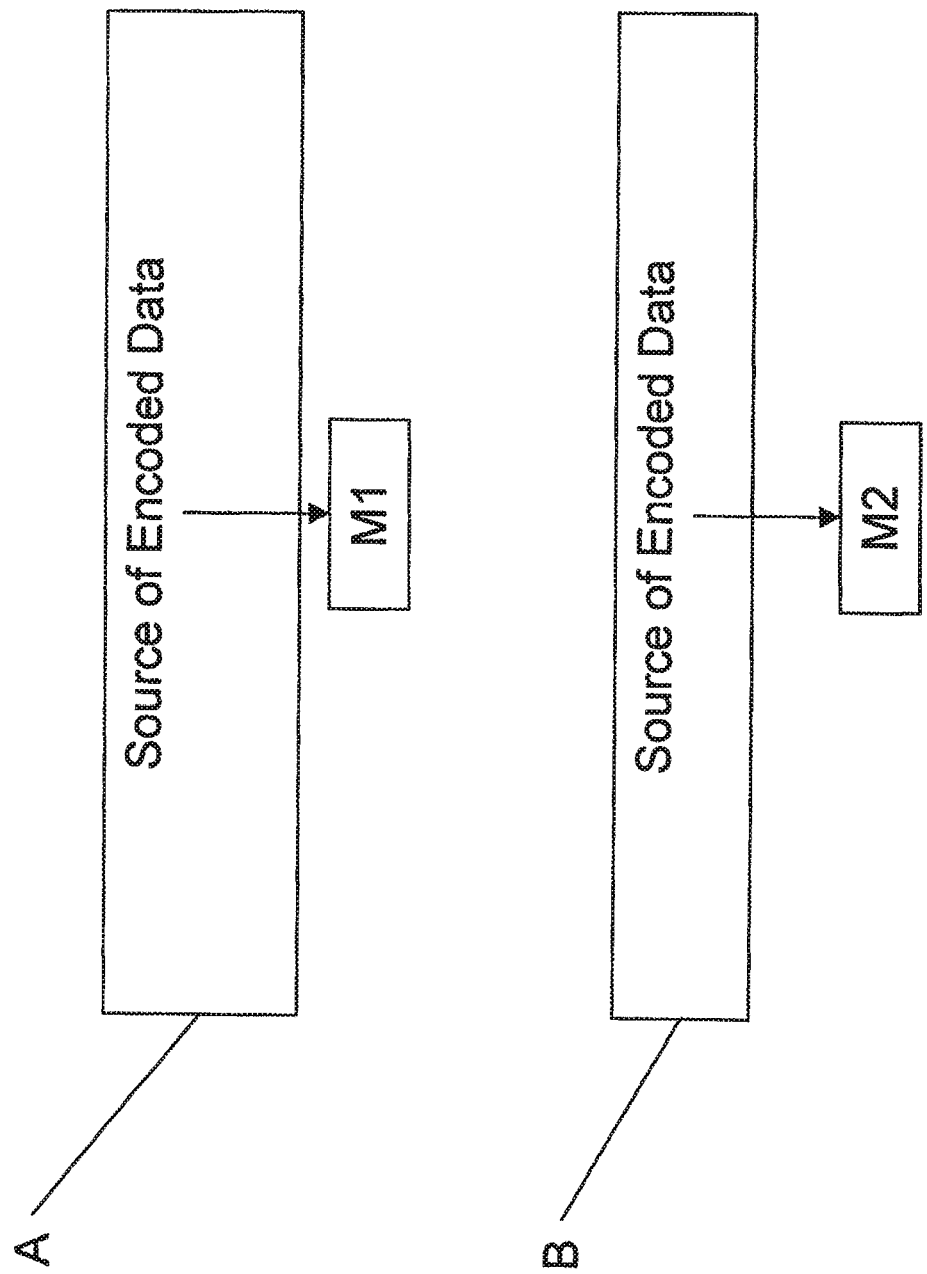

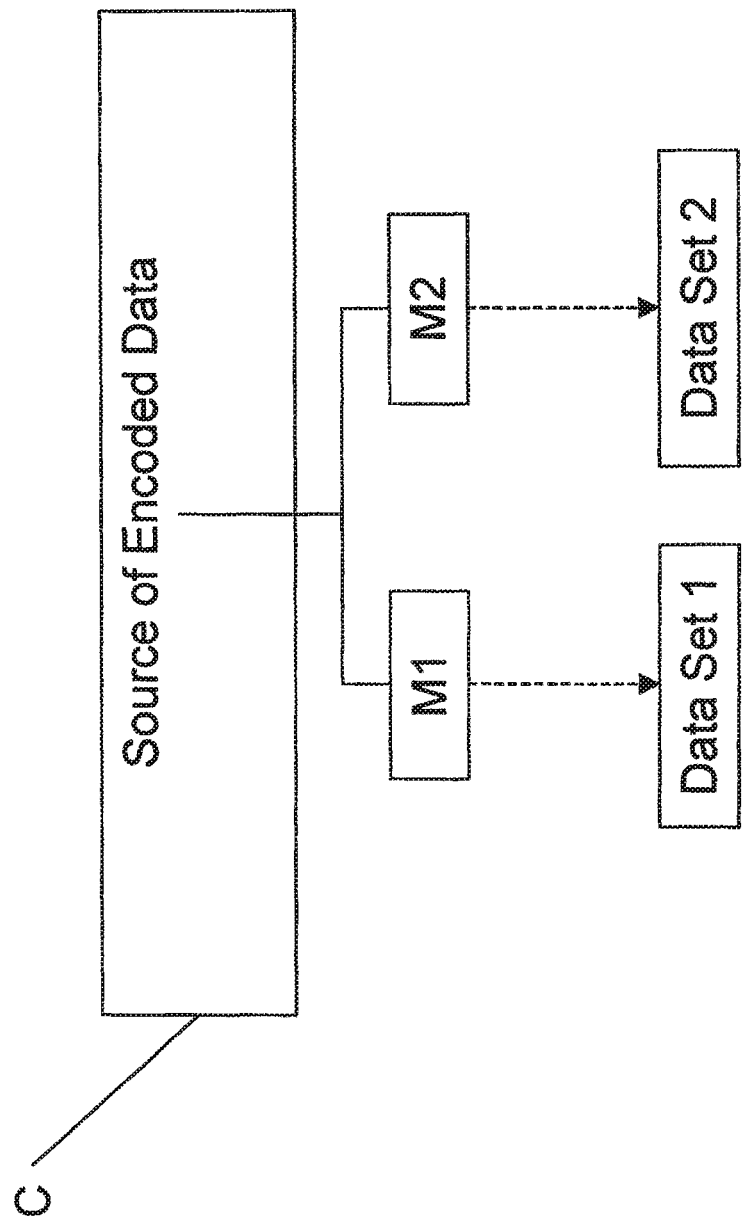

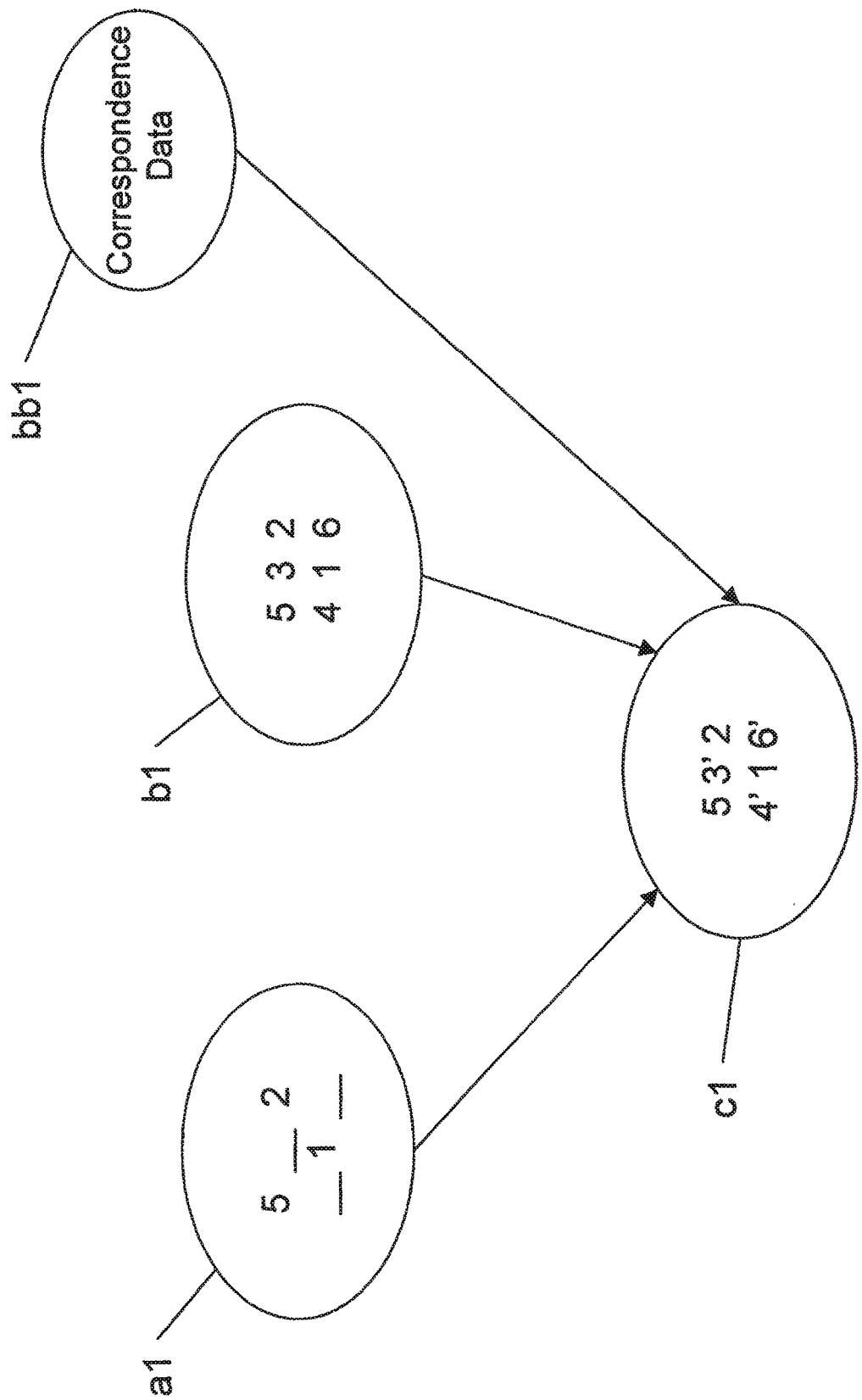

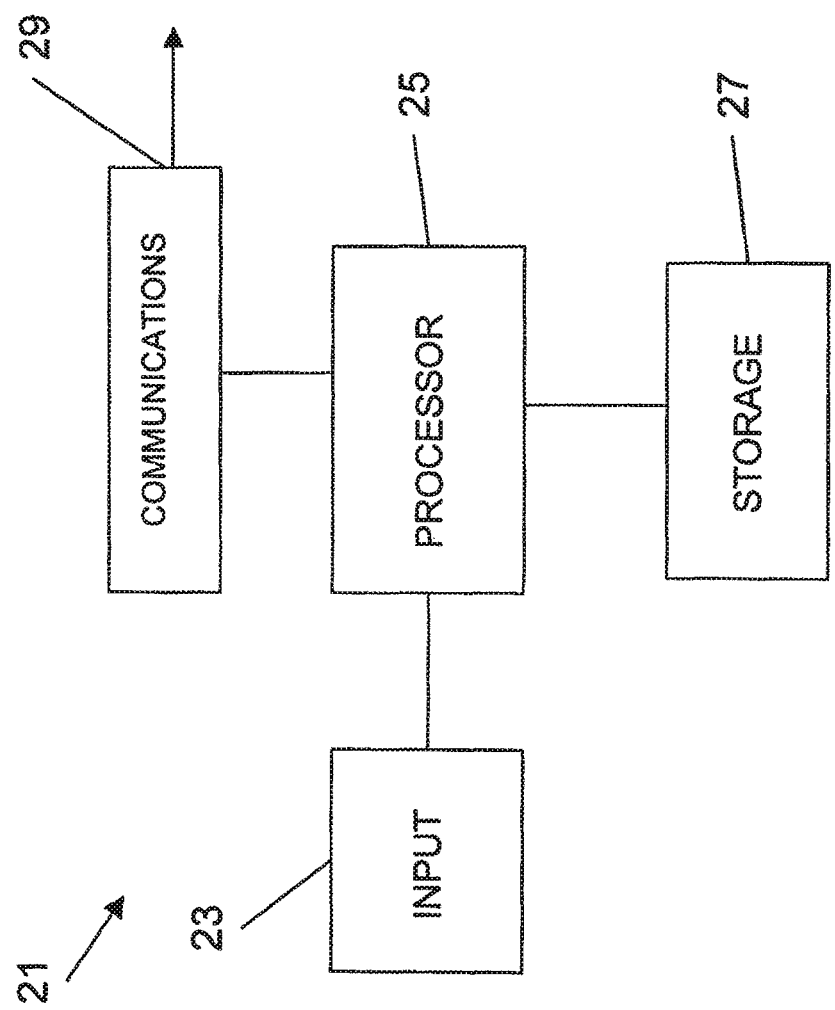

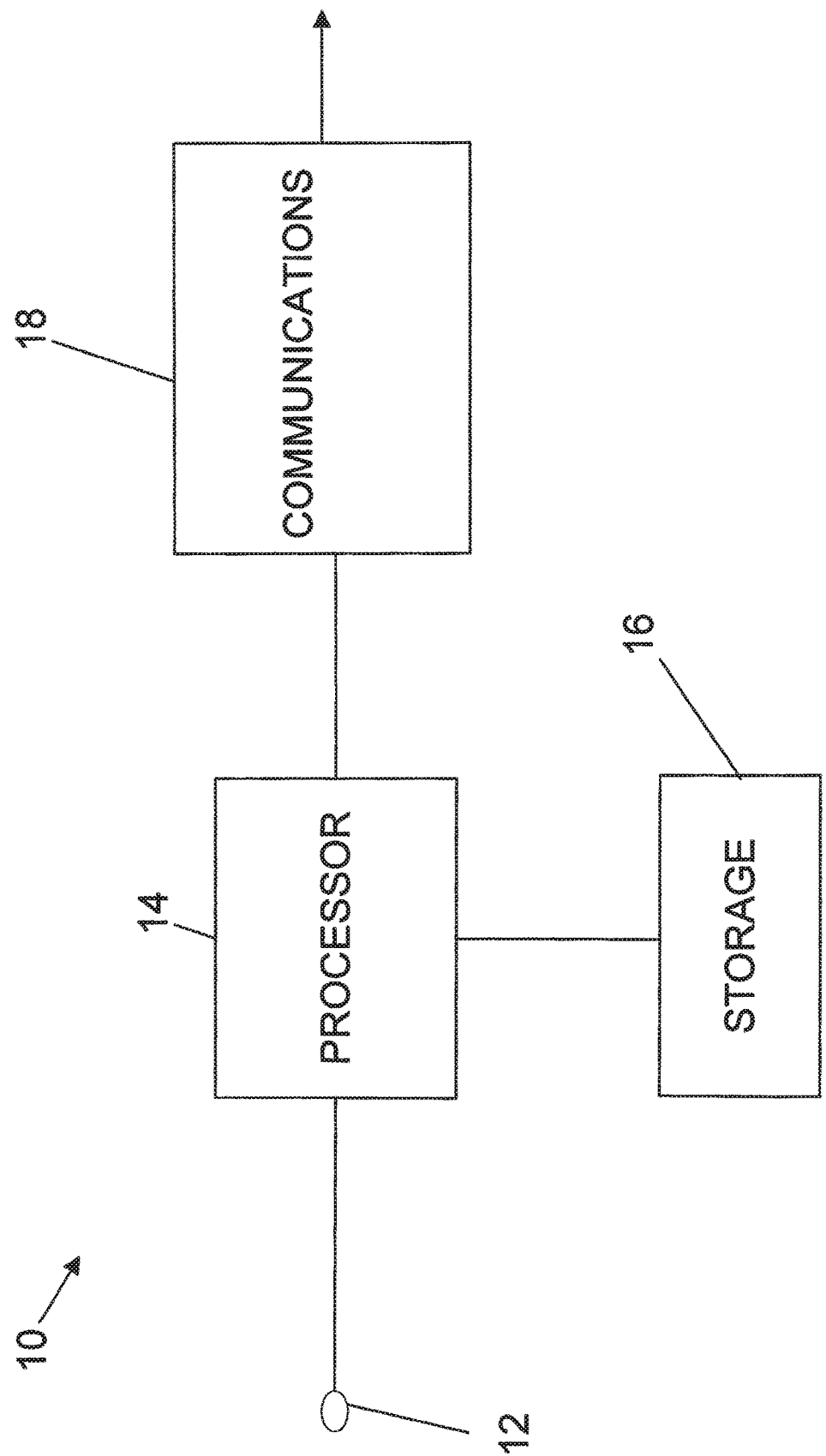

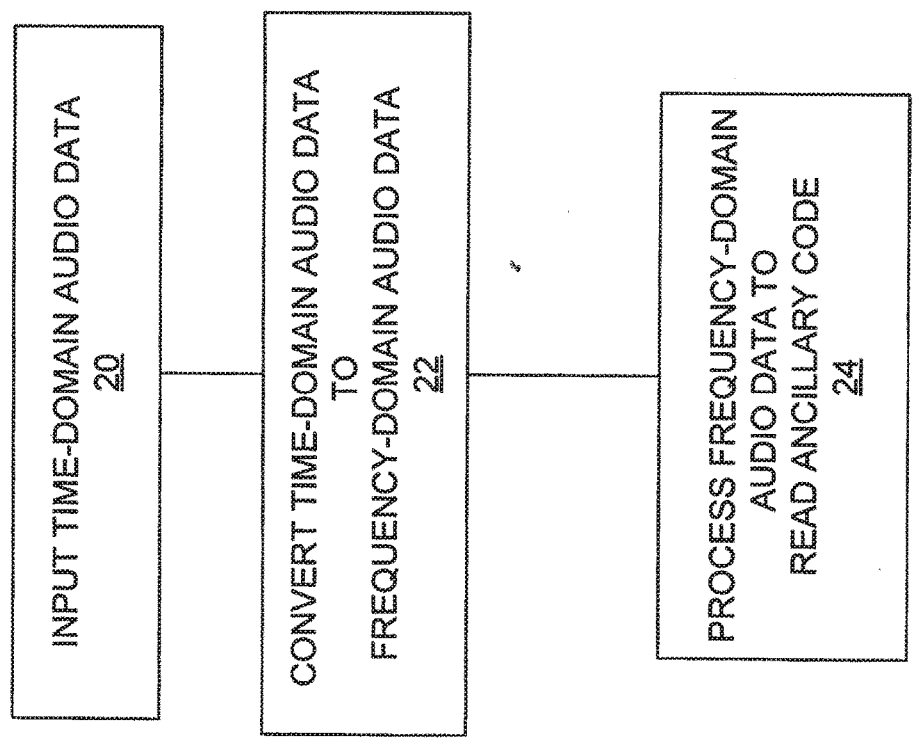

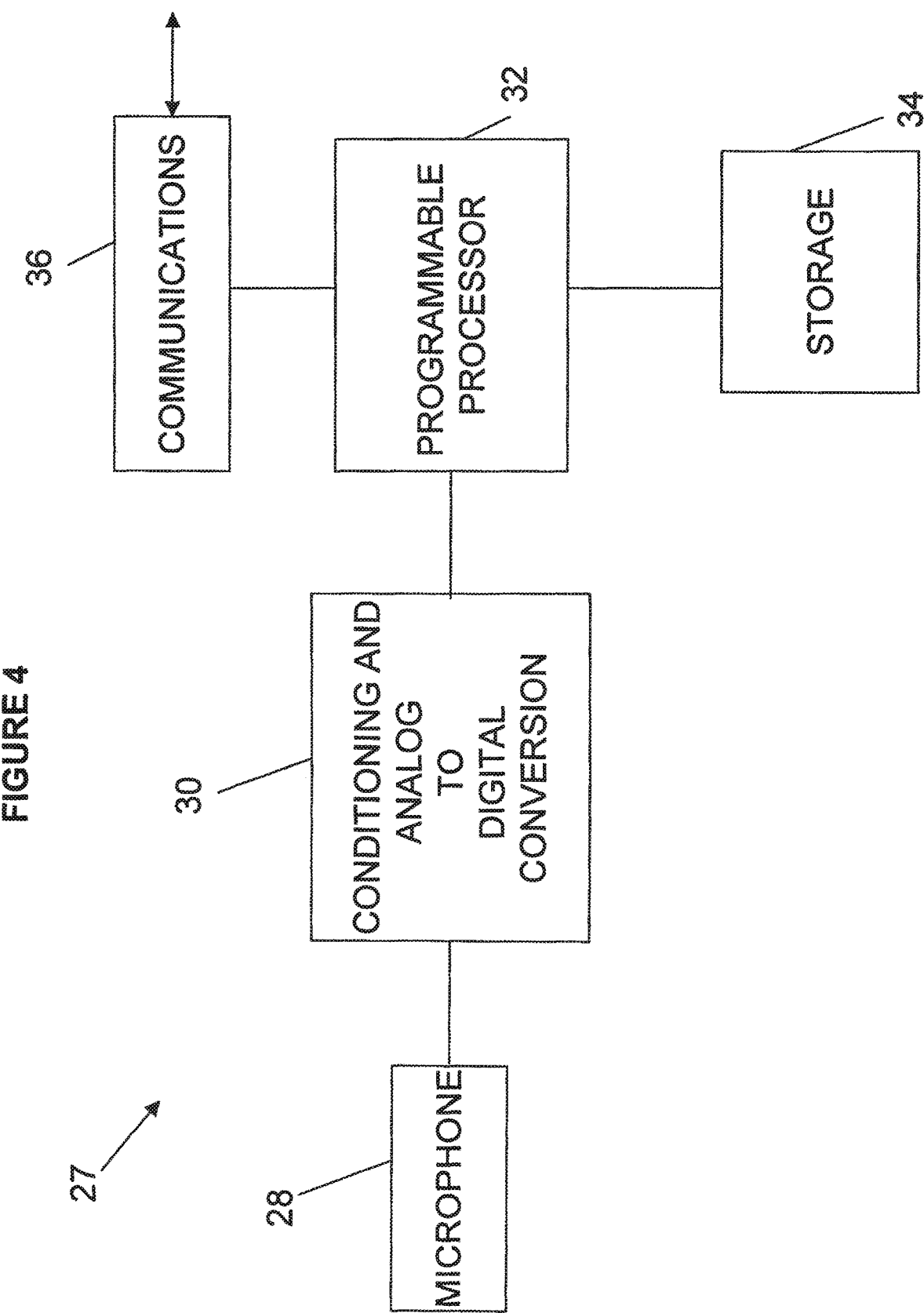

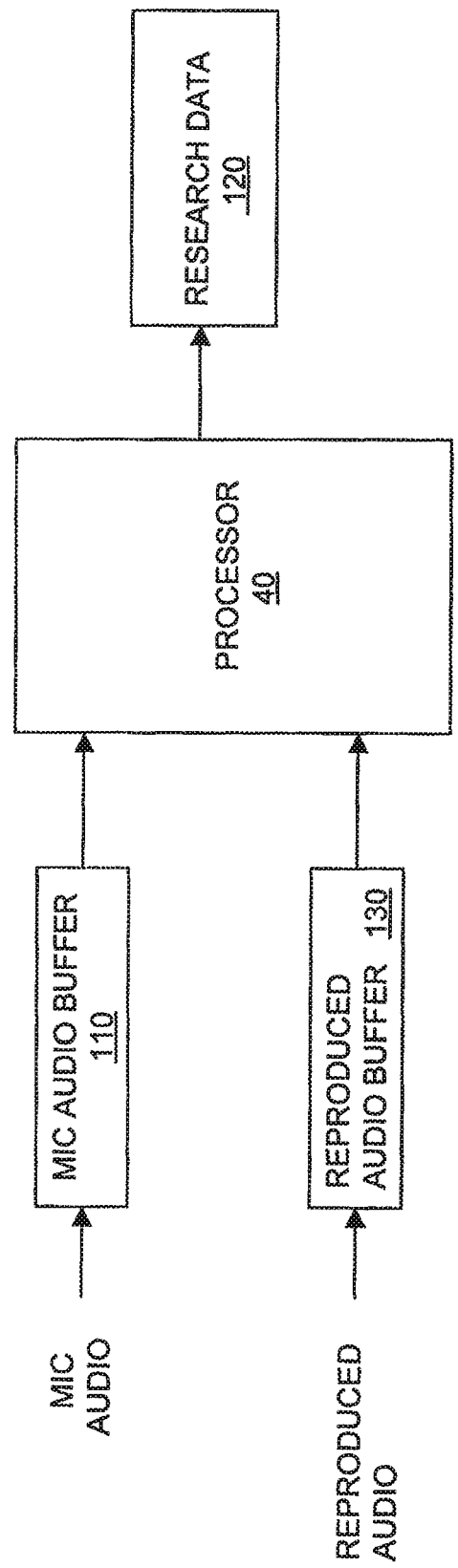

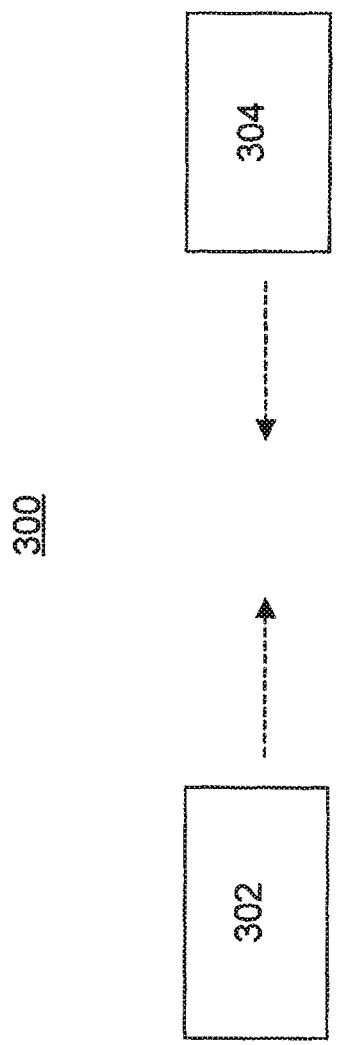

GATHERING RESEARCH DATA

RELATED APPLICATIONS

This application arises from a continuation of U.S. Non-Provisional patent application Ser. No. 14/804,901, filed Jul. 21, 2015, which claims the benefit of U.S. Non-Provisional patent application Ser. No. 12/246,225, filed Oct. 6, 2008, which claims the benefit of U.S. Provisional Patent Application No. 60/978,117, filed Oct. 6, 2007. U.S. Non-Provisional patent application Ser. No. 14/804,901, U.S. Non-Provisional patent application Ser. No. 12/246,225, and U.S. Provisional Patent Application No. 60/978,117 are hereby incorporated by reference in their entireties.

BACKGROUND

Methods and systems for gathering research data are disclosed.

BRIEF DESCRIPTION OF THE DRAWINGS

FIG. 1A illustrates a first instance of reception of data encoded with an ancillary code according to a preferred embodiment of the invention.

FIG. 1B illustrates a second instance of reception of data encoded with an ancillary code according to a preferred embodiment of the invention.

FIG. 2B illustrates an exemplary data set in which multiple elements are omitted from Data Set 1 of FIG. 1B.

FIG. 2C illustrates a research data gathering system for processing research data according to a preferred embodiment of the invention.

FIG. 3 illustrates a block diagram of a research data gathering system for processing research data according to a preferred embodiment of the invention.

FIG. 3A illustrates a process flow chart relating to the system of FIG. 3.

FIG. 4 illustrates a research data gathering system for processing research data according to another preferred embodiment of the invention.

FIGS. 5 and 5A illustrate a block diagram of a cellular telephone modified to execute a research operation according to a preferred embodiment of the invention.

FIGS. 7A and 7B illustrate a system for determining proximity of two potable research monitors according to a preferred embodiment of the invention.

SUMMARY OF THE INVENTION

Figure 2A:
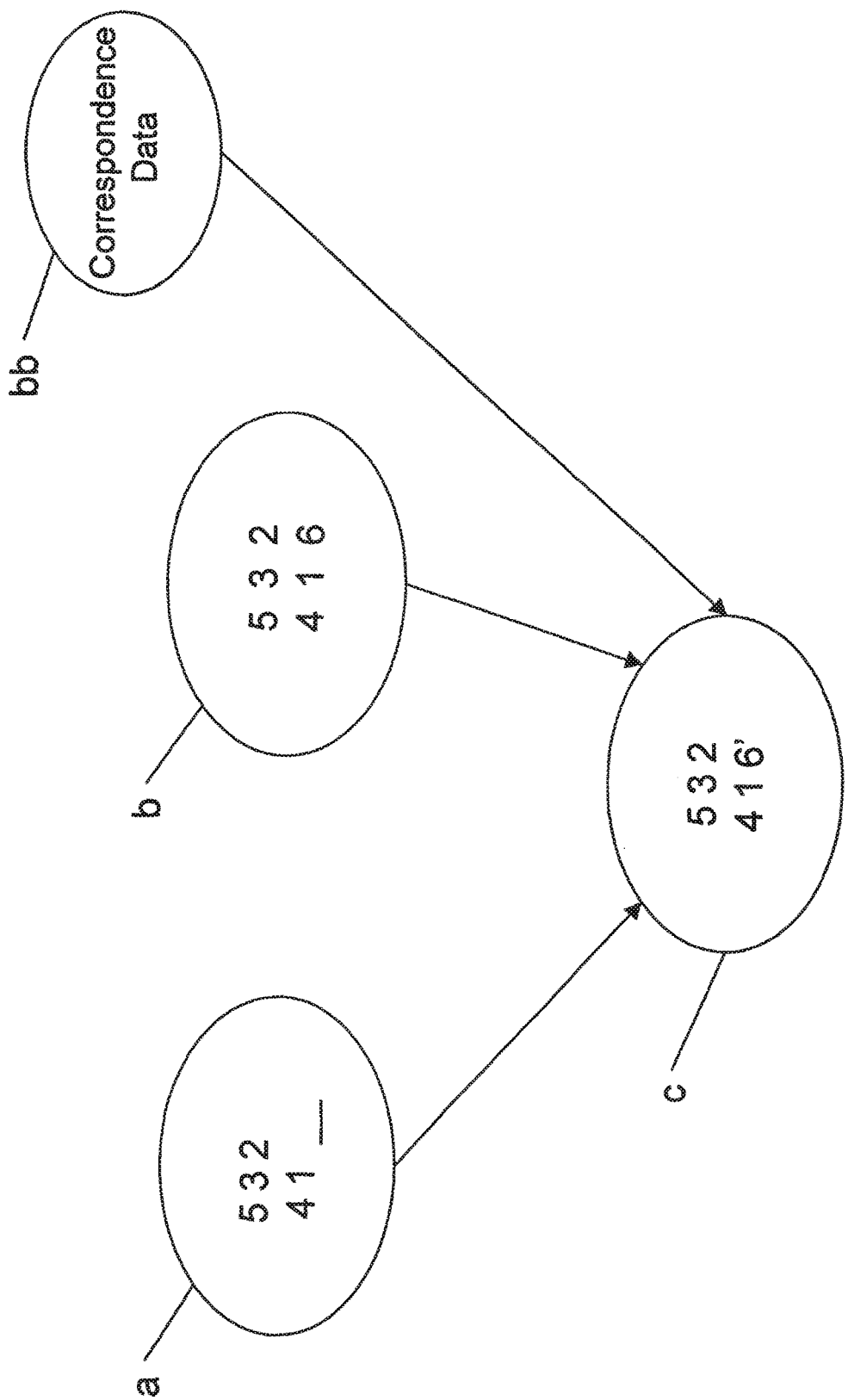
FIG. 2A illustrates an exemplary set of data such as would be labeled Data Set 1 of FIG. 1B.

For this application, the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique and that is humanly perceptible, with or without the aid of a machine or device, without regard to the form or content of such data, and including but not limited to audio, video, audio/video, text, images, animations, databases, broadcasts, displays (including but not limited to video displays, posters and billboards}, signs, signals, web pages, print media and streaming media data.

The term "research data" as used herein means data comprising (1) data concerning usage of media data, (2) data concerning exposure to media data, and/or (3) market research data.

The term "presentation data" as used herein means media data, or content other than media data, to be presented to a user.

The terms "ancillary code" and "code" as used herein means data encoded in, added to, combined with or embedded in media data to provide information identifying, describing and/or characterizing the media data, and/or other information useful as research data, as well as data based on such data encoded in, added to, combined with or embedded in media data.

The terms "reading" and "read" as used herein mean a process or processes that serve to recover research data that has been added to, encoded in, combined with or embedded in, media data.

The term "omitted" as used herein in connection with data, means either (1) data not included in a data set produced by reading an ancillary code, (2) data not recovered with sufficient certainty or probability according to a predetermined standard to qualify for inclusion in such a data set, or (3) a missing data set that should have been present as indicated by other data. As an example, data is "omitted" when a partial data set is provided that lacks one or more symbols that should be present in the data set. As a further example, data is "omitted" where a device fails to read any portion of a data set that should have been present in data received by the device as indicated by the presence of one or more data sets in the received data that were read by the device, by one or more data sets read by one or more other devices or as indicated by data stored in a reference database. As a still further example, data is "omitted" where a device fails to read any portion of a data set that should have been present in data received by the device as indicated by data providing different information that was read by the device, the presence of one or more data sets in data received by one or more other devices or as indicated by data stored in a reference database.

The term "database" as used herein means an organized body of related data, regardless of the manner in which the data or the organized body thereof is represented. For example, the organized body of related data may be in the form of one or more of a table, a log, a map, a grid, a packet, a datagram, a frame, a file, an e-mail, a message, a document, a report, a list or in any other form.

The term "network" as used herein includes both networks and internetworks of all kinds, including the Internet, and is not limited to any particular network or inter-network.

The terms "first", "second", "primary" and "secondary" are used to distinguish one element, set, data, object, step, process, function, activity or thing from another, and are not used to designate relative position, or arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

The term "processor" as used herein means processing devices, apparatus, programs, circuits, components, systems and subsystems, whether implemented in hardware, software or both, and whether or not programmable. The term "processor" as used herein includes, but is not limited to one or more computers, hardwired circuits, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data.

The terms "panelist," "panel member," "respondent" and "participant" are interchangeably used herein to refer to a person who is, knowingly or unknowingly, participating in a study to gather information, whether by electronic, survey or other means, about that person's activity.

The term "activity" as used herein includes, but is not limited to, purchasing conduct, shopping habits, viewing habits, computer usage, Internet usage, exposure to media, personal attitudes, awareness, opinions and beliefs, as well as other forms of activity discussed herein.

The term "research device" as used herein shall mean {1} a portable user appliance configured or otherwise enabled to gather, store, process and/or communicate research data, or to cooperate with other devices to gather, store, process and/or communicate research data, and/or (2) a research data gathering, storing, processing and/or communicating device.

The term "research operation" as used herein means an operation comprising gathering, processing, storing and/or communicating research data.

The term "portable user appliance" (also referred to herein, for convenience, by the abbreviation "PUA") as used herein means an electrical or non-electrical device capable of being carried by or on the person of a user or capable of being disposed on or in, or held by, a physical object (e.g., attache, purse) capable of being carried by or on the user, and having at least one function of primary benefit to such user, including without limitation, a cellular telephone, a personal digital assistant ("PDA"), a Blackberry device, a radio, a television, a game system (e.g., a Gameboy® device), a notebook computer, a laptop computer, a GPS device, a personal audio device (such as an MP3 player or an iPod® device), a DVD player, a two-way radio, a personal communications device, a telematics device, a remote control device, a wireless headset, a wristwatch, a portable data storage device (e.g., Thumb™ drive), a camera, a recorder, a keyless entry device, a ring, a comb, a pen, a pencil, a notebook, a wallet, a tool, a flashlight, an implement, a pair of glasses, an article of clothing, a belt, a belt buckle, a fob, an article of jewelry, an ornamental article, a shoe or other foot garment (e.g., sandals), a jacket, and a hat, as well as any devices combining any of the foregoing or their functions.

Monitors are disclosed that implement an ability to read ancillary codes contained in media or other content as research data. A respective one of a plurality of such monitors reads ancillary codes comprising such research data to produce an associated data set. On occasion, data enabling completion of the data set is omitted or the entire data set is omitted, thereby decreasing or eliminating the utility of the data set in a research operation. However, data gathered by one or more others of the plurality of monitors and/or data indicating circumstances under which such data was gathered, often demonstrates a correspondence with data gathered by the respective one of the plurality of such monitors and/or data indicating circumstances under which such data was gathered, so that the data omitted from the data set can be supplied. Also, where a device fails to read all or part of a first ancillary code that should have been present in data received thereby, the data omitted as a result of such failure may be inferred where the device successfully reads other ancillary codes present in the received data that carry information different from that conveyed by the first ancillary code.

Further, in circumstances where such a device fails to read all or part of an ancillary code that should be present in media or other content, it is possible to supply omitted data from a reference database based on data indicating a correspondence of media or content from which an ancillary code was read in part or such ancillary code or data encoded thereby, and either media or content stored in a reference database or data stored therein identifying such ancillary code or data encoded thereby. Thereby, the desired utility of information represented by the first data set can be obtained.

Data of various types enabling an evaluation or determination of correspondence between multiple data sets, each of which is associated with a respective portable meter, may be obtained as provided in U.S. Pat. No. 6,845,360 to Jensen et al, issued Jan. 18, 2005; U.S. Provisional Patent Application 60/857,714, filed Nov. 7, 2006; U.S. Non-provisional patent application Ser. No. 10/800,447, filed Mar. 15, 2004; U.S. Non-provisional patent application Ser. No. 10/800,883, filed Mar. 15, 2004; U.S. Non-provisional patent application Ser. No. 11/092,497, filed Mar. 29, 2005; U.S. Non-provisional patent application Ser. No. 11/643,128, filed Dec. 20, 2006; U.S. Non-provisional patent application Ser. No. 11/777,051, filed Jul. 12, 2007; and U.S. Non-provisional patent application Ser. No. 10/093,676, filed Mar. 8, 2002. Each of the above patent and patent applications is assigned to the assignee of the instant application, and are hereby incorporated by referenced in their entireties. Still further techniques for obtaining various types of data for enabling an evaluation or determination of correspondence between multiple data sets, are disclosed herein.

A method of gathering research data is provided. The method comprises receiving first data encoded with first research data as a first ancillary code at a first monitoring device; reading the first ancillary code to provide first research data from which data is omitted; receiving second data encoded with second research data as a second ancillary code at a second monitoring device, reading the second ancillary code to provide the second research data, the second research data comprising a data portion corresponding to the omitted data; obtaining correspondence data indicating a correspondence between the first research data and the second research data; and augmenting the first research data with the data portion of the second research data.

A system for processing research data is provided. The system comprises an input for receiving first research data first data and provided from a first monitoring device; second research data provided from at least one second monitoring device, the second research data comprising the omitted first data; and correspondence data indicating a correspondence between the first research data and the second research data; and a processor coupled with the input to receive the first research data, the second research data and the correspondence data, and configured to process the received data to augment the partially recovered first research data with the omitted first data.

A method for processing research data gathered by a plurality of monitoring devices is provided, the research data comprising message data read by the monitoring devices from media data encoded with ancillary codes encoding the message data, the message data as read by one or more of the monitoring devices omitting one or more data portions. The method comprises processing the message data to produce a database of corresponding message data; receiving the one or more omitted data portions from a source other than the one or more monitoring devices; and processing the corresponding message data and the one or more data portions to produce complete message data associated with the one or more monitoring devices.

A method for processing research data gathered by a monitoring device is provided, the research data comprising message data read by the monitoring device from media data encoded with an ancillary code encoding the message data, the message data as read by the monitoring device omitting a data portion. The method comprises receiving the omitted data portion from a source other than the monitoring device; and processing the message data and the omitted data portion to produce complete message data including the omitted data portion.

A method for processing research data gathered by a plurality of monitoring devices is provided, the research data comprising message data read by the monitoring devices from media data encoded with ancillary codes encoding the message data. The method comprises for each of the message data, determining whether it represents an ancillary code encoded in the media data, and if so, storing an indication that the message data is valid; processing a plurality of the valid message data to determine portions of the media data that are encoded and portions that are unencoded; and storing data in a database indicating portions of the media data that are encoded.

A method for processing research data gathered by a plurality of monitoring devices is provided, the research data comprising message data read by the monitoring devices from media data encoded with ancillary codes encoding the message data. The method comprises processing a plurality of the message data to determine portions of the media data that are encoded and portions that are unencoded; and storing encoded portions data in a database indicating portions of the media data that are encoded.

A method for processing message data gathered by a plurality of monitoring devices is provided, the message data being encoded as ancillary codes in media data by at least one encoder and read at least in part by the monitoring devices from the encoded media data. The method comprises receiving media data encoded data produced by the at least one encoder indicating that the media data is encoded; and processing the message data and the media data encoded data to produce media data exposure and/or usage data.

A method for processing first message data gathered by a monitoring device, the message data being read by the monitoring device from media data encoded with a first ancillary code encoding the first message data and included in a media data exposure database of the monitoring device, wherein the monitoring device fails to read the first message data at least in part, the method comprising: providing a complete copy of the first message data based on a message read by at least one other monitoring device; and augmenting the media data exposure database of the monitoring device using the complete copy of the first message data.

A method of processing research data, comprising: providing a first data set produced by a research data monitor by reading an ancillary code encoded in media data, the first data set omitting data expected therein; providing a second data set comprising data corresponding to the media data from a source other than the research data monitor; and processing the first data set and the second data set to produce processed data comprising at least one of: a completed first data set comprising the data omitted from the first data set; code omission data indicating that a portion of the media data is unencoded; and further data characterizing the media data in addition to that represented by the first data set.

A method of detecting a proximity of two portable research data monitors is provided. The method comprises transmitting a presence message from a first portable research data monitor; and detecting the presence message in a second portable research data monitor.

A system for detecting a proximity of two portable research data monitors is provided. The system comprises a first research data monitor comprising a first short range transmitter operative to transmit a first presence message indicating a presence of the first research data monitor; and a second research data monitor comprising a receiver operative to receive the first presence message.

A method of synchronizing widely dispersed devices in a research data gathering system is provided. The method comprises receiving widely available timing data from a source external to the research data gathering system in each of a plurality of research data gathering devices located remotely from one another, adjusting internally produced timing data in each of the plurality of research data gathering devices based on the widely available timing data, receiving the widely available timing data at a processing facility of the research data gathering system, and adjusting system timing data of the processing facility based on the widely available timing data.

A research data gathering system is provided. The research data gathering system comprises a plurality of research data gathering devices located remotely from one another, each of the research data gathering devices comprising an internal clock operative to produce internal clock data, an input coupled to receive widely available timing data from a source external to the research data gathering system and a processor coupled with the internal clock and the input to receive the internal clock data and the widely available timing data and configured to adjust the internal clock data based on the widely available timing data. The system further comprises a processing facility configured to process research data gathered by the plurality of research data gathering devices and comprising a system clock operative to produce system clock data for the research data gathering system, an input coupled to receive the widely available timing data and a processor coupled with the internal clock and the input to receive the system clock data and the widely available timing data and configured to adjust the system clock data based on the widely available timing data.

A research data gathering system is provided. The research data gathering system comprises a plurality of research data gathering devices located remotely from one another and a processing facility configured to process research data gathered by the plurality of research data gathering devices, each of the research data gathering devices and the processing facility comprising an input coupled to receive widely available timing data from a source external to the research data gathering system and a processor configured to produce clock data based on the widely available timing data.

DETAILED DESCRIPTION OF THE INVENTION

The disclosed methods and systems, as well as particular features and advantages of various embodiments thereof will become more apparent from the following detailed description considered with reference to the accompanying drawings in which the same elements depicted in different drawing figures are assigned the same reference numerals.

FIGS. 1A and 1B illustrate instances of reception of data encoded with an ancillary code encoding research data, such as encoded media, in monitoring devices M1 and M2. In certain ones of such instances, the monitoring devices M1 and M2 comprise portable monitoring devices. In certain ones of such instances, the monitoring devices M1 and M2 comprise stationary monitoring devices. In certain ones of such instances, one of the monitoring devices M1 and M2 comprises a stationary monitoring device, while the other thereof comprises a portable monitoring device. In FIG. 1A, a source of encoded data "A" is received by monitor M1, and a source of encoded data "B" is received by monitor M2. In FIG. 1B, a source of encoded data "C" is commonly received by monitors M1 and M2, for example, where monitors M1 and M2 are located in the same room or in the presence of a common source of media data or content, such as a television, radio, audio system, video game, or at a theater, so that both receive data "C". In each of FIGS. 1A and 1 8, each of the monitors M1 and M2 attempts to read ancillary codes encoded in a respective one of the sources of encoded data "A", "B", or "C" to produce the research data therefrom. The produced research data comprises a Data Set 1 and a Data Set 2, produced respectively by monitors M1 and M2, and which are shown, for example, in FIG. 1B.

Each of the monitors M1 and M2 is coupled to a source of encoded data by a wired coupling, or, a wireless coupling comprising an acoustic medium, a Bluetooth™ protocol, a ZigBee™ protocol, an inductive link, a capacitive link, an RF link, infrared link, a link provided by visible light (e.g., to convey a image or video data) or otherwise.

During the attempted collection of Data Set 1, for example, situations and/or circumstances may arise which cause collection of data, and particularly Data Set 1, to be incomplete or even missing in its entirety. Such situations and circumstances can, for instance, comprise a dropout in a communications channel, or excessive noise in such a channel, or inaccurate recording, or equipment/technical failure. For instance, where the ambient acoustic medium is used to couple encoded sound data to a microphone of a monitoring device, noise sources such as conversations, dogs barking, babies crying, appliance noises, and wind and engine noise (in an automobile, for example) can interfere with complete reading of an ancillary code by the monitoring device.

Such an incomplete collection of data resulting in Data Set 1 output by monitor M1 may resemble the exemplary set of data illustrated in FIG. 2A at "a". Therein, there is illustrated a grouping of numerals representing elements of the Data Set 1 wherein expected data, for example in the form of the numeral "6", is omitted because of, for example, any of the aforementioned situations and/or circumstances discussed above. With respect to the type of data gathered and represented as Data Set 1 and as shown at "a", it is to be understood that Data Set 1 may comprise, for example, various data, whether ordered or unordered, whether apparently logical or illogical, and whether anticipated or unanticipated in any regard.

Data Set 2 output by monitor M2 is represented at "b". Upon inspection, it will be seen that Data Set 2 includes elements that correspond to the elements included in the incomplete Data Set 1, and so may correspond to Data Set 1 had it been read in its entirety. Correspondence data "bb" is employed to establish a likelihood that Data Set 1 corresponds to Data Set 2, based on which the element omitted from Data Set 1, represented at "a" by "_" is determined, and is provided to augment the Data Set 1 now comprising numerals "1-6'" so that Data Set 1 includes all expected elements. Herein, the prime "'" appended to the numeral "6" represents that its source is Data Set 2. Even where Data Set 1 is absent in its entirety from the data read by monitor M1, based on the correspondence data "bb", Data Set 2 may be used to augment the data read by monitor M1 with a copy of Data Set 2. Accordingly, the expected utility of the data gathered by portable meter M1 can be obtained.

FIG. 2B illustrates a scenario in which multiple elements are omitted from Data Set 1, as shown at "a1". The omitted data may take any form which renders Data Set 1 to be incomplete, and moreover, incomplete in ways not shown in FIG. 2B. Data Set 2, as shown at "b1", is a complete data set for which correspondence data "bb1" enables a determination that Data Set 2 corresponds to Data Set 1. Based on this determination, complete Data Set 1, as shown at "c1", is produced by augmenting the incomplete Data Set 1 illustrated at a1, wherein the prime "'" symbol is used to represent that the indicated symbols are supplied from Data Set 2. Even where Data Set 1 is absent in its entirety from the data read by monitor M1, based on the correspondence data "bb1", Data Set 2 may be used to augment the data read by monitor M1 with a copy of Data Set 2.

It is to be understood that correspondence data is data, or a representation thereof, which is useable to infer correspondence between an incomplete data set, as in the case of Data Set 1 or even a completely absent Data Set 1, and an otherwise complete data set, as in the case of Data Set 2. Such correspondence data may comprise, for example, time and/or date of collection of Data Set 1 and Data Set 2, the location or locations of monitors M1 and M2 where they received the encoded data read as Data Sets 1 and 2, relative locations of monitors M1 and M2 (such as in-home, out-of-home, at work, at a certain commercial establishment, or in a vehicle, or proximity of the monitors M1 and M2 to each other), the contents of Data Sets 1 and 2, one or more data sets obtained by reading other ancillary codes accompanying those from which Data Sets 1 and 2 were produced. In certain embodiments, where the correspondence data demonstrates a high probability that two monitors received the same media, a data set from one of the monitors may be used to augment an incomplete data set of the other, or even to provide a data set for inclusion in a record of the other monitor where it completely fails to read an ancillary code. Such correspondence data can comprise data indicating that the two monitors were at the same location (such as a room in a dwelling or at the same theater) at the same time or time period, or that the two monitors were in close proximity to each other (such as data obtained by a short range wireless transmission from one monitor to the other, or data collected by a third monitoring device detecting that both monitors were in close proximity}.

In certain embodiments, if N monitors read ancillary codes from media supplied via the same media network, station or channel, to produce the same N complete data sets each of which also comprises the same content as Data Set 1 (although Data Set 1 is incomplete or absent), and the times at which all such data sets are produced (or ancillary codes are read) correspond, it is determined that Data Set 1 is the same as the N complete data sets, and Data Set 1 is augmented with the missing data from the corresponding complete data set. Here, N is a natural number greater than or equal to 1. N is statistically established as a number of monitoring devices having read the complete message data, which is sufficiently large to satisfy a predetermined probability that the message data were correctly read by the plurality of monitoring devices. Statistical methods for determining a probability that an event has occurred based on a number of detections of such an event are well known in the art, and so, need not be disclosed in greater detail herein. As noted above, in appropriate circumstances, N may be selected as 1, particularly where correspondence data provides a sufficiently high probability that a single monitoring device having read the complete message data received the same media as the monitor that produced Data Set 1.

In certain further embodiments, where monitor M1 partially reads an exemplary ancillary code 123X (where "X" represents one or more unread code symbols) at a time T1 or within a time interval T1' and also records exposure to network, station and/or channel Y at T1 or T1', and a different monitor M78 partially reads the exemplary ancillary code 123X at the same time T1 or time interval T1' without also recording exposure to the same network, station or channel Y at T1 or T1', and at least N still other monitors read complete exemplary codes 123 . . . at the same time or time interval while exposed to the same network, station or channel, the partial codes read by monitors M1 and M78 are augmented to correspond to the complete codes read by the N monitors and it is deemed that monitor 78 was also exposed to network, station or channel Y at time T1 or time T1'. Again, N is a natural number greater than or equal to 1. In certain additional embodiments, under the same conditions, it is not deemed that monitor 78 was also exposed to network, station or channel Y at time T1 or time T1', but rather some other, unidentified source. In still further embodiments, where monitor M1 partially reads an exemplary ancillary code 123X (where "X" represents one or more unread code symbols) at a time T1 or within a time interval T1' but without recording exposure to a network, station or channel, and at least N other monitors read the complete exemplary ancillary code 123 . . . at the same time T1 or time interval T1', without recording exposure to a network, station or channel, the partial code read by monitor M1 is augmented to correspond to the complete codes read by the N monitors, and it is deemed that monitor M1 was exposed to an unidentified network, station or channel. N is statistically established as a number of monitoring devices having read the complete exemplary ancillary code 123 . . . at the same time T1 or time interval T1', without recording exposure to a network, station or channel, which is sufficiently large to satisfy a predetermined probability that the data received by the monitors did not include an ancillary code identifying a network, station or channel. Statistical methods for determining a probability that an event has occurred based on a number of detections of such an event are well known in the art, and so, need not be disclosed in greater detail herein. Of course, where it is sufficiently probable that a given monitor has received the same encoded media as another monitor that failed to read one or more codes therein, N may be selected as 1.

While the exemplary ancillary codes in the various embodiments and examples disclosed herein have been represented as sequences of numbers, in practice the ancillary codes may represent or include any combination of symbols, such as letters, numerals (whether decimal, binary, hexadecimal or other form), other kinds of symbols, or combinations of the foregoing, and may be either an ordered set of symbols or an unordered set of symbols. Moreover, the ancillary code may include any number of symbols and the symbols may be encoded in media data using any encoding technique.

FIG. 2C is a diagram illustrating certain embodiments of a research data gathering system 21 for processing research data. System 21 comprises an input 23 for receiving monitored data comprising partially recovered first research data such as Data Set 1, and second research data comprising the expected data, such as Data Set 2. Device 21 further receives correspondence data, such as data "bb" or "bb1". Each of the data is received and processed by a processor 25 to enable augmentation of the partially recovered first research data with the expected data.

Storage device 27, coupled to processor 25, receives data from the processor 25 for storage. Communications 29 is coupled with the processor 25 and is provided for communicating processed data such as that shown at "c" and "c1" in FIGS. 2A and 2B, respectively, to a further processor or file server for further processing and/or storage, to a display for presentation to a user, or, to a processing facility for producing research data reports using the augmented first research data.

It is to be understood that input 23 may, for example, comprise either a network interface card, modem, wireless network card, transceiver, hard drive, manual input device such as a keyboard or mouse, or any other type of device useful for receiving data.

In certain embodiments of the research data gathering system 21, first messages read by one or more monitoring devices but which omit data portions or even complete messages, are received by the system 21 via input 23 or communications 29. For example, where the first messages comprise data sets that are expected to include one or more elements that have been omitted, the data sets may be sets of ordered data or data for which no order is prescribed. In certain ones of such embodiments, second messages read by further monitoring devices are also received by system 21 through input 23 or communications 29. The second messages, however, comprise complete data sets. The processor 25 processes the first and second messages to determine which appear to match. For example, processor 25 may determine that a match of one of the first messages and one or more of the second messages exists (a) where all of the elements of such first message correspond to elements of the one or more second messages, (b) where all of the elements of the first message correspond to elements of the one or more second messages and are ordered in the same manner, and/or (c) where fewer than all elements of the first data set correspond to elements of the one or more second messages, but the number of elements of the first set which do not thus correspond is no greater than a predetermined natural number. One possible, but not necessary, criterion for matching in case (c) may be that the elements of the first message that do not correspond be associated with data indicating a reduced likelihood that such elements were read correctly. In certain ones of these embodiments, where at least N (where N is a natural number) of the one or more second messages match the first message, processor 25 determines that these messages correspond and either adds to the first message such element or elements of the matching second message or messages omitted from the first message or produces a new data set corresponding to a complete message, and stores such augmented first message or such new data set in storage 27 in association with data identifying the source of the first message (e.g., a monitor, panelist and/or household identification). N is statistically established as a number of matching messages, which is sufficiently large to satisfy a predetermined probability that the first message data was read correctly by its corresponding monitor. Statistical methods for determining a probability that an event has occurred based on a number of detections of such an event are well known in the art, and so, need not be disclosed in greater detail herein. Corresponding processes are carried out for other received data which omit expected data. After the messages have been augmented as explained above and stored in storage 27, they are retrieved by processor 25 which either (a) produces reports of media data exposure by processing the retrieved data, or processes the retrieved data preliminary to preparation of such reports, or (b) communicates the retrieved data to another processor via communications 29 for preparation of such reports or further processing preliminary to such preparation.

In certain embodiments, rather than match the first message against one or more of the second messages, processor 25 retrieves one or more data sets from storage 27 that represent messages determined to be valid and attempts to match the first message therewith. If a match of the first message with one or more such retrieved messages is found by processor 25, for example, using one or more of the criteria set forth hereinabove, the processor 25 determines that these messages correspond and either adds to the first message such element or elements of the matching retrieved message or messages omitted from the first message or produces a new data set corresponding to a complete message, and stores such augmented first message or such new data set in storage 27 in association with data identifying the source of the first message. Corresponding processes are carried out for other received data which omit expected data.

In certain embodiments, the first message and either or both of the second messages and retrieved messages are associated with additional data useful in establishing a match. In addition to matching the first message with other messages that are complete or are determined to be valid, processor 25 processes such further data in determining whether the messages match. In certain ones of such embodiments, time data indicating times when or time intervals in which the various messages were read or gathered are associated with the first message and the second message or messages, and/or the retrieved messages, and such time data are compared by processor 25 to determine if it is likely the messages correspond. If one or more matching messages and times are found by processor 25, in certain embodiments it determines that the messages correspond. A further criterion employed in certain ones of these embodiments is that at least N such matching messages or matching messages from N monitors be found in order to determine a match, where N is a natural number greater than or equal to 1. N is statistically established as a number of matching messages determined to be valid or matching messages from N monitors having read or gathered the complete message data at corresponding times or time intervals, which is sufficiently large to satisfy a predetermined probability that the first message data was correctly read by its corresponding monitoring device. Statistical methods for determining a probability that an event has occurred based on a number of detections of such an event are well known in the art, and so, need not be disclosed in greater detail herein.

In certain ones of such embodiments, location data indicating places where the various messages were read or gathered, or relative locations where such messages were read or gathered (such as in-home, out-of-home, at work, at a certain commercial establishment, or in a vehicle, or proximity of two or more monitors to each other) are associated with the first message and either or both of the second message or messages and/or retrieved messages and such location data are compared by processor 25 to determine if it is likely the messages correspond. If one or more matching messages are found by processor 25 to have been read or gathered in corresponding locations, in certain embodiments it determines that the messages correspond. Where the correspondence data, apart from any matching codes, provides a sufficient probability that the same codes should have been read by two or monitors, codes omitted in the data or one or more such monitors are supplemented using codes read by one or more others of such monitors and/or using data from a reference database in storage 27.

Where the monitoring devices are arranged to read multiple ancillary codes each including a message that conveys different information, in certain embodiments processor 25 makes use of such messages read by the monitor that read the first message, along with any such messages read by the monitor or monitors which read the second message, or any such messages associated with the retrieved message or messages, to determine a match. As an example, where the various monitors are arranged to read multiple ancillary codes simultaneously present in media data from which the first and second messages were read, the first and second messages encoded as a first ancillary code might include data indicating the identity of a program, commercial, promotion or public service announcement, while separate ancillary codes may encode a network identification message and/or a station or channel identification message. Techniques for encoding and decoding such multiple messages are disclosed in U.S. Pat. No. 6,845,360 B2 to Jensen et al., incorporated herein by reference. If one or more matching messages and corresponding additional messages are found by processor 25, in certain embodiments it determines that the matching messages correspond. A further criterion employed in certain ones of these embodiments is that at least N such matching messages or matching messages from N monitors be found in addition to either corresponding location data or corresponding additional messages, in order to determine a match, where N is a natural number greater than or equal to 1. N is statistically established as a number of matching messages determined to be valid or matching messages from N monitors having read or gathered the complete message data at corresponding locations or with corresponding additional messages, which is sufficiently large to satisfy a predetermined probability that the first message data was correctly read by its corresponding monitoring device. Statistical methods for determining a probability that an event has occurred based on a number of detections of such an event are well known in the art, and so, need not be disclosed in greater detail herein.

In certain embodiments of the research data gathering system 21, messages read by one or more monitoring devices, are received by the system 21 via input 23 or communications 29. In certain ones of such embodiments, the received messages are complete messages (read completely or augmented by means of other data), while in others the received messages omit expected data, and in still others, both complete and incomplete messages are received by system 21. In such embodiments, the received messages are processed by processor 25 to determine if they are valid. In certain ones of such embodiments, processor 25 carries out a matching process to determine whether the received messages match with others of the received messages, and/or with messages retrieved from storage 27. In certain ones of such embodiments, processor 25 applies a criterion that, to determine whether a given received message is valid it must match at least N other received messages and/or retrieved messages, where N is a natural number greater than or equal to 1 and which is sufficiently large to satisfy a predetermined probability that the received message data was read correctly by its corresponding monitor. The matching criteria described hereinabove for augmenting incomplete messages may also be employed in the presently described process of matching messages to validate them.

In still further embodiments, additional data is employed by processor 25 to determine whether the received message data are valid, including one or more of time data associated with the received messages, location data associated therewith and additional messages that convey different information and obtained by reading ancillary codes in the media data in addition to the ancillary code read as the received message data. Such data may be processed by processor 25 in the same manner as such data is processed to augment incomplete message data, as described hereinabove.

In certain embodiments of the research data gathering system 21, messages read by one or more monitoring devices, are received by the system 21 via input 23 or communications 29. In certain ones of such embodiments, the received messages are complete messages (read completely or augmented by means of other data), while in others the received messages omit expected data, and in still others, both complete and incomplete messages are received by system 21. In such embodiments, the received messages are processed by processor 25 to determine which portions of media data received by the monitoring devices that read such messages, were encoded, and processor 25 stores encoded portions data in storage 27 representing such portions in association with one or more identifiers for such media data. In addition or in the alternative, processor 25 stores data indicating which portions of the media data were unencoded, or data indicating which portions were encoded as well as which were not encoded.

The encoded portions data with or without data indicating which portions of the media data were unencoded, is particularly useful in producing average minute ratings for media data (such as television programs), since it enables processing of the received message data identifying a particular program or other content using only the encoded portions of the media data. For example, if a program has a duration of one-half hour, but is only encoded during 27 minutes of such half hour, average minute ratings for the program will be produced based only on the encoded 27 minutes, rather than the full half hour duration.

In certain embodiments, processor 25 determines which portions of media data are encoded based on messages read by monitors exposed to such media data which are received by input 23 or communications 29. More specifically, for each of multiple time segments of the media data (e.g., one minute intervals), processor 25 counts the number of corresponding valid messages received by system 21. If, for a given time segment, at least N valid messages were so received, processor 25 determines that such time segment was encoded and stores data indicating this event in storage 27 in association with data identifying the time segments and the media data. N is a natural number which is statistically established as a number which is sufficiently large to satisfy a predetermined probability that the media data was encoded during the time segment being processed.

In certain embodiments of the research data gathering system 21, messages read by one or more monitoring devices, are received by the system 21 via input 23 or communications 29. In certain ones of such embodiments, the received messages are complete messages (read completely or augmented by means of other data), while in others the received messages omit expected data, and in still others, both complete and incomplete messages are received by system 21. The system 21 also receives data produced by one or more media data encoders identifying media data that was encoded thereby, along with time or time interval of encoding data indicating when such encoding was performed. After processing of the received messages by processor 25 to complete messages omitting expected data and validating such messages that qualify for validation, processor 25 either produces media exposure data based on the complete and validated messages as well as the data received from the encoder or encoders, or communicates such data to a different processor for producing such media exposure data. In certain ones of such embodiments, processor 25 or another processor produces average minute ratings for media data based on the complete and validated messages as well as the data received from the encoder or encoders.

The description provided hereinbelow provides disclosures of various embodiments of monitors, such as monitors M1 and M2, for reading ancillary codes contained in the media received thereby.

FIG. 3 is a diagram illustrating certain embodiments of a research data monitor 10. An input device 12 is provided for receiving monitored data. The input device 12 can comprise either a single device or multiple devices, stationary at a source to be monitored, or multiple devices, stationary at multiple sources to be monitored. Alternatively, the input device 12 can be incorporated in a portable monitoring device that can be carried by an individual to monitor various sources as the individual moves about.

Where acoustic data including media data, such as audio data, is monitored, the input device 12 typically would be an acoustic transducer such as a microphone, having an input which receives media data in the form of acoustic energy and which serves to transduce the acoustic energy to electrical data. Where media data in the form of light energy, such as video data, is monitored, the input device 12 takes the form of a light-sensitive device, such as a photodiode, or a video camera. Light energy including media data could be, for example, light emitted by a video display. The device 12 can also take the form of a magnetic pickup for sensing magnetic fields associated with a speaker, a capacitive pickup for sensing electric fields or an antenna for electromagnetic energy. In still other embodiments, the device 12 takes the form of an electrical connection to a monitored device, which may be a television, a radio, a cable converter, a satellite television system, a game playing system, a VCR, a DVD player, a portable player, a computer, a web appliance, or the like. In still further embodiments, the input device 12 is embodied in monitoring software running on a computer to gather media data.

A processor 14, coupled to the input device 12, is provided for processing the monitored data. Storage device 16, coupled to processor 14, receives data from the processor 14 for storage. Communications 18 is coupled with the processor 14 and is provided for communicating the processed data to a processing facility for use in preparing reports including research data.

FIG. 3A is a diagram for use in explaining operation of certain embodiments of the system of FIG. 3. As shown at 20, time-domain audio data is received by the input device 12. Once received, the time-domain audio data, representing the audio signal as it varies over time, is converted by processor, as shown at 22, to frequency-domain audio data, i.e., data representing the audio signal as it varies with frequency. As will be understood by one of ordinary skill in the art, conversion from the time domain to the frequency domain may be accomplished by any one of a number of existing techniques comprising, for instance, discrete Fourier transform, fast Fourier transform (FFT), OCT, wavelet transform, Hadamard transform or other time-to-frequency domain transformation, or else by digital or analog filtering. Processor 14 stores the frequency-domain audio data temporarily in storage 16 with or without a time stamp recoding the time at which the ancillary code was read.

Processor 14 processes the frequency-domain audio data to read an ancillary code therein to produce a data set for use in identifying the audio signal or obtaining other information concerning the audio signal (such as a source or distribution path thereof), and stores the data set in storage 16 with or without a time stamp recording the time at which the ancillary code was read.

Where audio media includes ancillary codes, suitable decoding techniques are employed to detect the encoded information, such as those disclosed in U.S. Pat. Nos. 5,450,490 and 5,764,763 to Jensen, et al., U.S. Pat. No. 5,579,124 to Aijala, et al., U.S. Pat. Nos. 5,574,962, 5,581, 800 and 5,787,334 to Fardeau, et al., U.S. Pat. No. 6,871,180 to Neuhauser, et al., U.S. Pat. No. 6,862,355 to Kolessar, et al., U.S. Pat. No. 6,845,360 to Jensen, et al., U.S. Pat. No. 5,319,735 to Preuss et al., U.S. Pat. No. 5,687,191 to Lee, et al., U.S. Pat. No. 6,175,627 to Petrovich et al., U.S. Pat. No. 5,828,325 to Wolosewicz et al., U.S. Pat. No. 6,154,484 to Lee et al., U.S. Pat. No. 5,945,932 to Smith et al., US 2001/0053190 to Srinivasan, US 2003/0110485 to Lu, et al., U.S. Pat. No. 5,737,025 to Dougherty, et al., US 2004/0170381 to Srinivasan, and WO 06/14362 to Srinivasan, et al., all of which hereby are incorporated by reference herein.

Examples of techniques for encoding ancillary codes in audio, and for reading such codes, are provided in Bender, et al., 'Techniques for Data Hiding", *IBM Systems Journal*, Vol. 35, Nos. 3 & 4, 1996, which is incorporated herein by reference in its entirety. Bender, et al. disclose a technique for encoding audio termed "phase encoding" in which segments of the audio are transformed to the frequency domain, for example, by a discrete Fourier transform (DFT), so that phase data is produced for each segment. Then the phase data is modified to encode a code symbol, such as one bit. Processing of the phase encoded audio to read the code is carried out by synchronizing with the data sequence, and detecting the phase encoded data using the known values of the segment length, the OFT points and the data interval.

Bender, et al. also describe spread spectrum encoding and decoding, of which multiple embodiments are disclosed in the above-cited Aijala, et al. U.S. Pat. No. 5,579,124.

Still another audio encoding and decoding technique described by Bender, et al. is echo data hiding in which data is embedded in a host audio signal by introducing an echo. Symbol states are represented by the values of the echo delays, and they are read by any appropriate processing that serves to evaluate the lengths and/or presence of the encoded delays.

A further technique, or category of techniques, termed "amplitude modulation" is described in R. Walker, "Audio Watermarking", BBC Research and Development, 2004. In this category fall techniques that modify the envelope of the audio signal, for example by notching or otherwise modifying brief portions of the signal, or by subjecting the envelope to longer term modifications. Processing the audio to read the code can be achieved by detecting the transitions representing a notch or other modifications, or by accumulation or integration over a time period comparable to the duration of an encoded symbol, or by another suitable technique.

Another category of techniques identified by Walker involves transforming the audio from the time domain to some transform domain, such as a frequency domain, and then encoding by adding data or otherwise modifying the transformed audio. The domain transformation can be carried out by a Fourier, OCT, Hadamard, Wavelet or other transformation, or by digital or analog filtering. Encoding can be achieved by adding a modulated carrier or other data (such as noise, noise-like data or other symbols in the transform domain) or by modifying the transformed audio, such as by notching or altering one or more frequency bands, bins or combinations of bins, or by combining these methods. Still other related techniques modify the frequency distribution of the audio data in the transform domain to encode. Psychoacoustic masking can be employed to render the codes inaudible or to reduce their prominence. Processing to read ancillary codes in audio data encoded by techniques within this category typically involves transforming the encoded audio to the transform domain and detecting the additions or other modifications representing the codes.

A still further category of techniques identified by Walker involves modifying audio data encoded for compression (whether lossy or lossless) or other purpose, such as audio data encoded in an MP3 format or other MPEG audio format, AC-3, DTS, A TRAG, WMA, ReaiAudio, Ogg Vorbis, APT X1 00, FLAG, Shorten, Monkey's Audio, or other. Encoding involves modifications to the encoded audio data, such as modifications to coding coefficients and/or to predefined decision thresholds. Processing the audio to read the code is carried out by detecting such modifications using knowledge of predefined audio encoding parameters.

It will be appreciated that various known encoding techniques may be employed, either alone or in combination with the above-described techniques. Such known encoding techniques include, but are not limited to FSK, PSK (such as BPSK), amplitude modulation, frequency modulation and phase modulation.

In certain embodiments, certain encoding techniques, such as those described in U.S. Pat. No. 6,871,180 to Neuhauser, et al., disclose audio encoding techniques that encode audio with one or more continuously repeating messages, each including a number of code symbols following one after the other along a timebase of the audio signal. Each code symbol comprises a plurality of frequency components. In certain embodiments of system 10 that are adapted to read continuously repeating messages, acoustic energy, or, sound, picked up by the input device 12 is continuously monitored to detect the embedded symbols comprising an encoded message. That is, decoding of an encoded message in the audio signal occurs continuously throughout operation of the system 10. In doing so, system 10 performs an FFT by means of processor 14 which is carried out on a continuing basis transforming a time segment of the audio signal to the frequency domain. In certain ones of such embodiments, a segment thereof comprising a one-quarter second duration is transformed to the frequency domain using an FFT, such that the segments overlap by, for example, 40%, 50%, 60%, 70% or 80%. System 10 separately evaluates for each component of the frequency code symbols in the encoded message whether the received energy comprises either a message or noise first by formulating a quotient comprising an associated energy value of a given frequency bin that would indicate such frequency components relative to a noise level associated with neighboring frequency bins. The noise level is obtained by averaging the energy levels of a predetermined number of frequency ranges neighboring the selected frequency bin being evaluated.

Storage 16 implements one or more accumulators for storage of the quotients associated with varying portions of the audio signal. Storage 16, for instance comprising a first-in/first-out (FIFO) buffer, enables each of the quotients to be continuously, repeatedly accumulated and sorted according to predetermined criteria. Such criteria comprises, optionally, a message length equal to that of the accumulator. Accordingly, where there are multiple messages simultaneously present in the audio, each accumulator serves to accumulate the frequency components of the code symbols in a respective one of the messages. In certain ones of these embodiments, multiple messages are detected as disclosed in U.S. Pat. No. 6,845,360 to Jensen, et al. Accumulation of the messages in this manner comprises an advantage of reducing the influence of noise which factors into the reading of the message.

With reference to FIG. 4, which illustrates at least one of certain advantageous embodiments of the system, a PUA 27 is shown which is configured for gathering research data. Audio data is received at the microphone 28, which may also comprise a peripheral of the PUA 27 allowing it to be located a distance from the remainder thereof should doing so provide added convenience to the user. The audio data is then conditioned and converted from its analog format to digital data, as shown at 30, in a manner understood by one of ordinary skill in the art. A programmable processor 32 coupled with the system then transforms the digital data to the frequency domain, optionally by OFT, FFT or other transform technique including OCT, wavelet transform, Hadamard transform, or else by digital or analog filtering. The PUA 27 further comprises storage 34, comprising a buffer such as a FIFO buffer addressed herein, for cooperation with the processor 32 in a manner well understood by one of ordinary skill in the art, to decode an ancillary code from the single data set produced by, for example, an FFT. Communications 36 receives data processed by the processor 32 and is coupled thereto for delivery to a remote processing location. In certain embodiments, storage 34 serves to retain information not immediately transmitted to communications 36.

Figure 5:
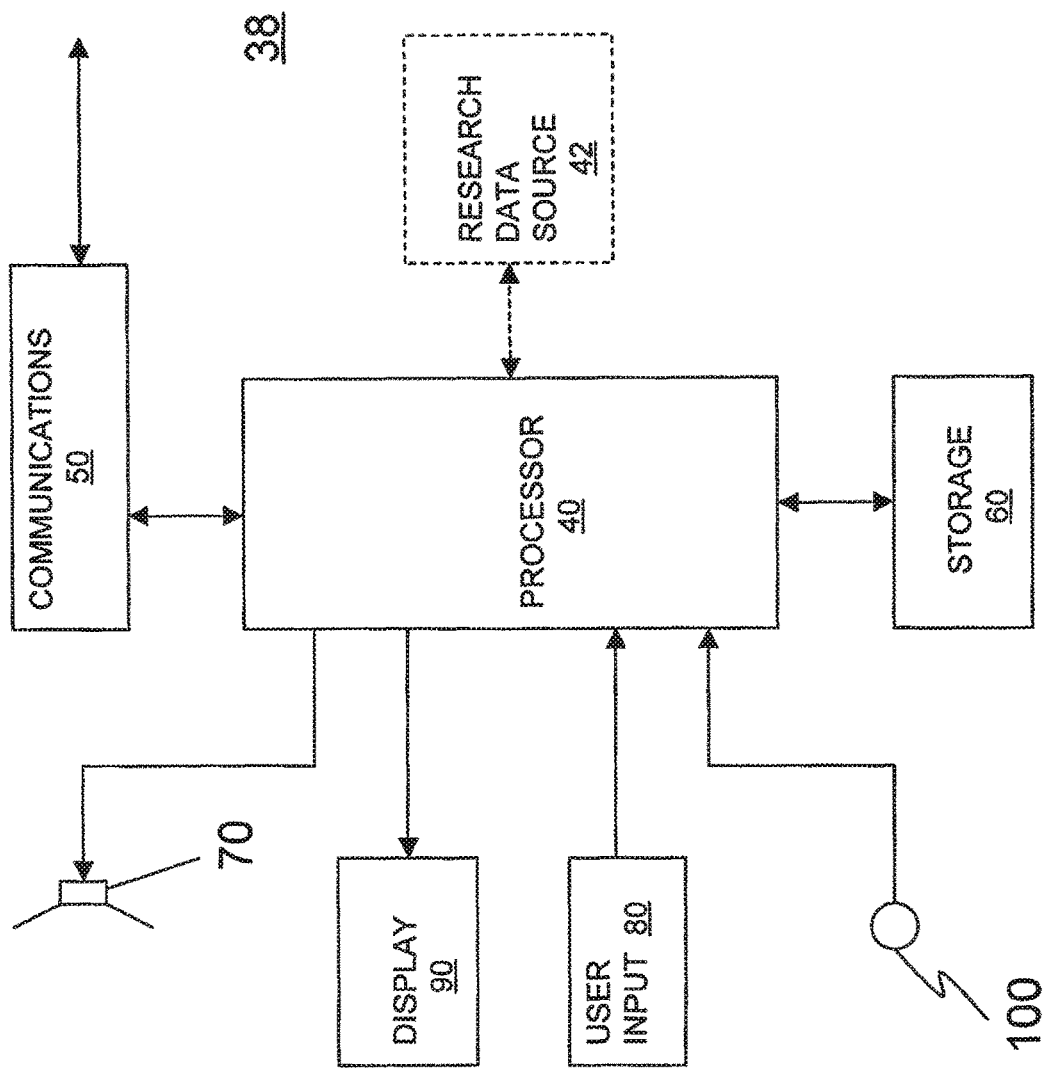

With reference to FIGS. 5 and 5A, there is illustrated a block diagram of a cellular telephone 38 modified to carry out a research operation. The cellular telephone 38 comprises a processor 40 operative to exercise overall control of the cellular telephone's operation and to process audio and other data for transmission or reception. Communications 50 is coupled to the processor 40 and is operative to establish and maintain a two-way wireless communication link with a respective cell of a cellular telephone network. In certain embodiments, processor 40 is configured to execute applications apart from or in conjunction with the conduct of cellular telephone communications, such as applications serving to download audio and/or video data to be reproduced by the cellular telephone, e-mail clients and applications enabling the user to play games using the cellular telephone. In certain embodiments, processor 40 comprises two or more processing devices, such as a first processing device (such as a digital signal processor) that processes audio, and a second processing device that exercises overall control over operation of the cellular telephone. In certain embodiments, processor 40 comprises a single processing device. In certain embodiments, some or all of the functions of processor are implemented by hardwired circuitry.

Cellular telephone 38 further comprises storage 60 coupled with processor 40 and operative to store data as needed. In certain embodiments, storage 60 comprises a single storage device, while in others it comprises multiple storage devices. In certain embodiments, a single device implements certain functions of both processor 40 and storage 60.

In addition, cellular telephone 38 comprises a microphone 100 coupled with processor 40 and serving to transduce the user's voice to an electrical signal which it supplies to processor 40 for encoding, and a speaker and/or earphone 70 coupled with processor 40 to transduce received audio from processor 40 to an acoustic output to be heard by the user. Cellular telephone 38 also includes a user input 80 coupled with processor 40, such as a keypad, to enter telephone numbers and other control data, as well as a display 90 coupled with processor 40 to provide data visually to the user under the control of processor 40.

In certain embodiments, cellular telephone 38 provides additional functions and/or comprises additional elements. In certain ones of such embodiments, the cellular telephone 38 provides e-mail, text messaging and/or web access through its wireless communications capabilities, providing access to media and other content. For example, Internet access via cellular telephone 38 enables access to video and/or audio content that can be reproduced by the cellular telephone 38 for the user, such as songs, video on demand, video clips and streaming media. In certain embodiments, storage 60 stores software providing audio and/or video downloading and reproducing functionality, such as iPod® software, enabling the user to reproduce audio and/or video content downloaded from a source, such as a personal computer via communications 50 or through direct Internet access via communications 50.

To enable cellular telephone 38 to gather research data, namely, data indicating exposure to audio such as programs, music and advertisements, research software is installed therein or downloaded thereto to control processor 40 to gather such data and communicate it via communications 50 to a research organization. The research software in certain embodiments also controls processor 40 to store the data in storage 60 for subsequent communication. The research software may be installed in the cellular telephone at the time of manufacture, such as in a non-volatile memory device, or downloaded to it subsequently by the research organization, by a third party such as a service provider, or by the panelist.

The research software controls the processor 40 to transduce the time-domain audio data produced by microphone 100 to frequency domain data and to read ancillary codes from the frequency domain data using one or more of the known techniques identified hereinabove, and then to store and/or communicate the codes that have been read for use as a research data indicating encoded audio to which the user was exposed. In certain embodiments, the research software controls the processor 40 to store samples of the transduced audio, either in compressed or uncompressed form for subsequent processing to read ancillary codes therein after transformation to the frequency domain.

Where the cellular telephone 38 possesses functionality to download and/or reproduce media data and/or other content for use as presentation data, in certain embodiments, research data concerning the usage and/or exposure to such media data and/or other content as well as audio data received acoustically by microphone 100, is gathered by cellular telephone 38 in accordance with the technique illustrated by the functional block diagram of FIG. 5A. Storage 60 of FIG. 5 implements an audio buffer 110 for audio data gathered with the use of microphone 100. In certain ones of these embodiments storage 60 implements a buffer 130 for data downloaded and/or reproduced by cellular telephone 38 to which the user is exposed via speaker and/or earphone 70 or display 90, or by means of a device coupled with cellular telephone 38 to receive the data therefrom to present it to a user. In some of such embodiments, the reproduced data is obtained from downloaded data, such as songs, web pages or audio/video data (e.g., movies, television programs, video clips). In some of such embodiments, the reproduced data is provided from a device such as a broadcast or satellite radio receiver of the cellular telephone 38 (not shown for purposes of simplicity and clarity). In certain ones of these embodiments storage 60 implements a buffer 130 for metadata of media data and/or content reproduced or received by cellular telephone 38 to which the user is exposed via speaker and/or earphone 70 or display 90, or by means of a device coupled with cellular telephone 38 to receive the data therefrom to present it to a user. Such metadata can be, for example, a URL from which the media data and/or other content was obtained, channel tuning data, program identification data, an identification of a prerecorded file from which the data was reproduced, or any data that identifies and/or characterizes the media data and/or other content, or a source thereof. Where buffer 130 stores audio data, buffers 110 and 130 store their audio data (either in the time domain or the frequency domain) independently of one another. Where buffer 130 stores metadata of audio data, buffer 110 stores its audio data (either in the time domain or the frequency domain) and buffer 130 stores its metadata, each independently of the other.

Processor 40 separately produces research data 120 from the contents of each of buffers 110 and 130 which it stores in storage 60. In certain ones of these embodiments, one or both of buffers 110 and 130 is/are implemented as circular buffers storing a predetermined amount of time-domain audio data representing a most recent time interval thereof as received by microphone 100 and/or reproduced by speaker and/or earphone 70, or downloaded by cellular telephone 38 for reproduction by a different device coupled with cellular telephone 38. Processor 40 decodes ancillary codes in the buffered audio data to produce research data 120 by converting the time-domain audio data to frequency-domain audio data and processing the frequency-domain audio data for reading an ancillary code therefrom. Where metadata is received in buffer 130, in certain embodiments the metadata is used, in whole or in part, as research data, or processed to produce research data. The research data is thus gathered representing exposure to and/or usage of audio data by the user where audio data is received in acoustic form by the cellular telephone 38 and where media data and/or other content is received in non-acoustic form (for example, as a cellular telephone communication, as an electrical signal via a cable from a personal computer or other device, as a broadcast or satellite signal or otherwise).

With reference again to FIG. 5, in certain embodiments, the cellular telephone 38 comprises a research data source 42 coupled by a wired or wireless coupling with processor 40 for use in gathering further or alternative research data to be communicated to a research organization. In certain ones of these embodiments, the research data source 42 comprises a location data producing device or function providing data indicating a location of the cellular telephone 38. Various devices appropriate for use as the research data source 42 include a satellite location signal receiver, a terrestrial location signal receiver, a wireless networking device that receives location data from a network, an inertial location monitoring device and a location data producing service provided by a cellular telephone service provider. In certain embodiments, research data source 42 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the cellular telephone 38. In certain embodiments, research data source 42 comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

Figure 6:
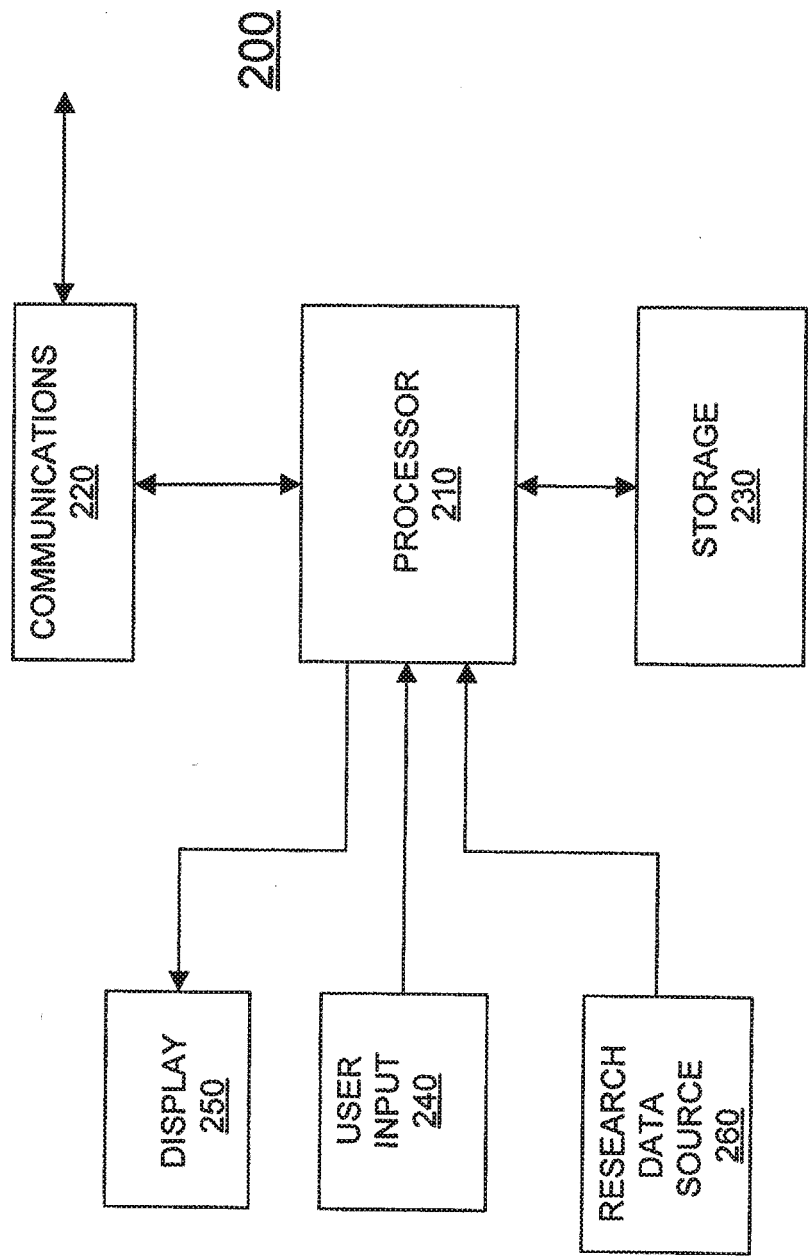
FIG. 6 illustrates a block diagram of a personal digital assistant modified to execute a research operation according to a preferred embodiment of the invention.

With reference to FIG. 6, there is illustrated a personal digital assistant (PDA) 200 modified to gather research data. The PDA 200 comprises a processor 210 operative to exercise overall control and to process data for, among other purposes, transmission or reception by the PDA 200. Communications 220 is coupled to the processor 210 and is operative under the control of processor 210 to perform those functions required for establishing and maintaining two-way communications over a network (not shown for purposes of simplicity and clarity).

In certain embodiments, processor 210 comprises two or more processing devices, such as a first processing device that controls overall operation of the PDA 200 and a second processing device that performs certain more specific operations such as digital signal processing. In certain embodiments, processor 210 employs a single processing device. In certain embodiments, some or all of the functions of processor 210 are implemented by hardwired circuitry.

PDA 200 further comprises storage 230 coupled with processor 210 and operative to store software that runs on processor 210, as well as temporary data as needed. In certain embodiments, storage 230 comprises a single storage device, while in others it comprises multiple storage devices. In certain embodiments, a single device implements certain functions of both processor 210 and storage 230.

PDA 200 also includes a user input 240 coupled with processor 210, such as a keypad, to enter commands and data, as well as a display 250 coupled with processor 210 to provide data visually to the user under the control of processor 210.

In certain embodiments, the PDA 200 provides additional functions and/or comprises additional elements. In certain embodiments, PDA 200 provides cellular telephone functionality, and comprises a microphone and audio output (not shown for purposes of simplicity and clarity), as well as an ability of communications 220 to communicate wirelessly with a cell of a cellular telephone network, to enable its operation as a cellular telephone. Where PDA 200 possesses cellular telephone functionality, in certain embodiments PDA 200 is employed to gather, store and/or communicate research data in the same manner as cellular telephone 38 (such as by storing appropriate research software in storage to run on processor), and communicates with system 10 in the same manner to set up, promote, operate, maintain and/or terminate a research operation using PDA 200.

In certain embodiments, communications 220 of PDA 200 provides wireless communications via Bluetooth protocol, Zig Bee™ protocol, wireless LAN protocol, infrared data link, inductive link or the like, to a network, network host or other device, and/or through a cable to such a network, network host or other device. In such embodiments, PDA 200 is employed to gather, store and/or communicate research data in the same manner as cellular telephone 38 (such as by storing appropriate research software in storage to run on processor), and communicates with system 10 in the same manner (either through a wireless link or through a connection, such as a cable) to set up, promote, operate, maintain and/or terminate a research operation using PDA 200.

PDA 200 receives audio data in the form of acoustic data and/or audio data communicated in electronic form via a wireless or wired link. PDA stores research software enabling PDA 200 to gather research data, namely, data indicating exposure to such audio data, by controlling processor 210 to gather such data and communicate it via communications 220 to a research organization. The research software in certain embodiments also controls processor 210 to store the data in storage 230 for subsequent communication. That is, processor 210 is controlled to read codes from the audio data in the same manner as any one or more of the embodiments explained hereinabove.

In certain embodiments, the PDA 200 comprises a research data source 260 coupled by a wired or wireless coupling with processor 210 for use in gathering further or alternative research data to be communicated to a research organization. In certain ones of these embodiments, the research data source 260 comprises a location data producing device or function providing data indicating a location of the cellular telephone PDA 200. Various devices appropriate for use as source include a satellite location signal receiver, a terrestrial location signal receiver, a wireless networking device that receives location data from a network, an inertial location monitoring device and a location data producing service provided by a cellular telephone service provider. In certain ones of these embodiments, research data source 260 comprises a device or function for monitoring exposure to print media, for determining whether the user is at home or out of home, for monitoring exposure to products, exposure to displays (such as outdoor advertising), presence within or near commercial establishments, or for gathering research data (such as consumer attitude, preference or opinion data) through the administration of a survey to the user of the PDA 200. In certain ones of these embodiments, research data source comprises one or more devices for receiving, sensing or detecting data useful in implementing one or more of the foregoing functions, other research data gathering functions and/or for producing data ancillary to functions of gathering, storing and/or communicating research data, such as data indicating whether the panelist has complied with predetermined rules governing the activity or an extent of such compliance. Such devices include, but are not limited to, motion detectors, accelerometers, temperature detectors, proximity detectors, satellite positioning signal receivers, RFID readers, RF receivers, wireless networking transceivers, wireless device coupling transceivers, pressure detectors, deformation detectors, electric field sensors, magnetic field sensors, optical sensors, electrodes, and the like.

As noted hereinabove, research software is provided to those of the foregoing devices implementing research operations by means of programmed processors. In certain embodiments, the research software is stored at the time of manufacture. In others, it is installed subsequently, either by a distributor, retailer, user, service provider, research organization or other entity by download to the respective device or by installation of a storage device storing the research software as firmware, or otherwise.

Figure 7B:
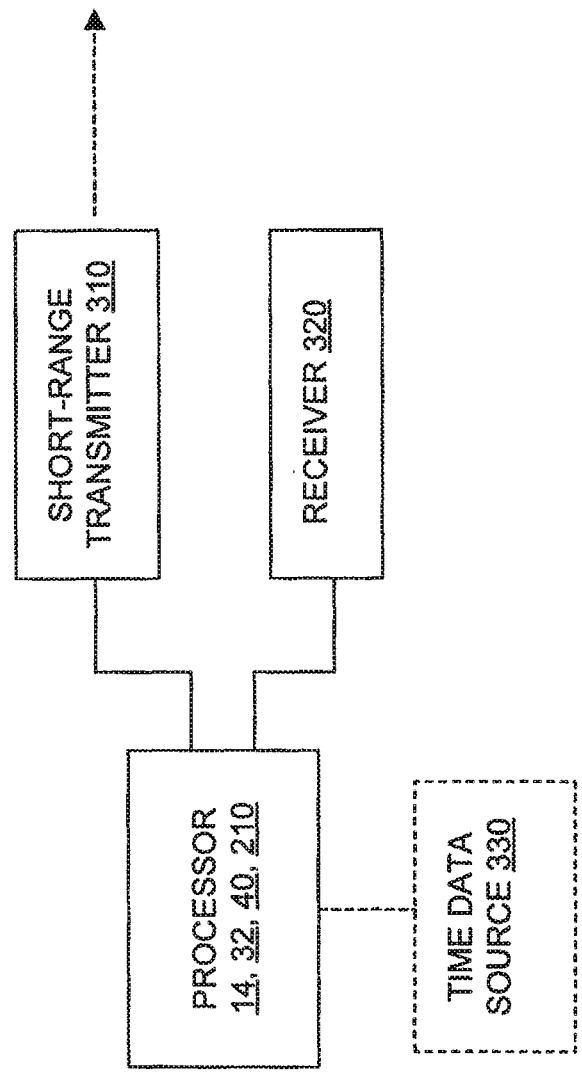

FIG. 7A illustrates a system 300 for determining a proximity of two portable research monitors 302 and 304. FIG. 7B partially illustrates each of the two portable research monitors 302 and 304, which is implemented in certain embodiments by the addition of a short range wireless transmitter 310 and a wireless receiver 320 to any of research data monitor 10, PUA 27, cellular telephone 38 and PDA 200. In certain embodiments, transmitter 310 and/or receiver 320 are implemented by existing components of monitor 10, cellular telephone 38 and PDA 200, such as a Bluetooth or ZigBee transceiver, a wireless networking transceiver or other RF transceiver, an infrared or visible light transceiver, or an acoustic transceiver (implemented, for example, by a microphone and speaker of the cellular telephone 38 or PDA 200). Various techniques may be employed to determine whether two monitors are in proximity, such as signal strength and data error rates. For example, if a monitor receives a transmission from another monitor that is below a predetermined signal strength or with a data error rate that is greater than a predetermined threshold, it may determine that the transmitting monitor is not in proximity, and vice versa. In certain embodiments, for example, where line-of-sight or acoustic transmission is employed, or where low power RF transmission is used, such techniques may not be necessary.

The respective processor 14, 32, 40 or 210 of the research data monitor 10, PUA 27, cellular telephone 38 or PDA 200, referred to herein as monitor 302 or monitor 304, is coupled with the short range transmitter 310 to control transmissions thereby. The respective processor controls transmitter 310 to transmit a short-range communication indicating either its presence or including data identifying the respective one of monitor 302 or 304. Such communication is transmitted either periodically, from time to time, or upon the occurrence of some event or condition (such as a change of location or motion of the monitor 302 or 304, and/or receipt of a short range transmission from the other one of monitor 302 or 304). In certain embodiments, transmitter 310 transmits such communication based on an internal control, rather than or in addition to a control from the respective processor. Receiver 320 is coupled with the respective processor to supply data from a communication received by receiver 320 from the other one of monitor 302 or 304.

When one of the monitors 302 or 304 receives such a communication from the other thereof, in certain embodiments, the respective processor controls the transmitter 310 to transmit a responsive communication indicating its proximity to the other monitor or providing data identifying its monitor. In certain embodiments, transmitter 310 responds directly to the receipt of the communication to transmit such responsive communication for receipt by the other monitor. In this manner, the two monitors detect that they are in proximity to one another.

In certain embodiments where such proximity is detected, the two monitors exchange identification data and store the identification data from the other thereof with a time stamp to record their proximity and the time it was detected. One or both of monitors 302 and 304 subsequently transmits a presence or identification communication for receipt by the other, either periodically or from time to time, or upon the occurrence of an event such as a change of location or movement of the respective monitor, or the receipt of another communication from the other monitor or the failure to receive such a communication after a period of time or the occurrence of such an event or condition.

In certain ones of such embodiments, a system, such as research data gathering system 21 of FIG. 2C, receives the data gathered by monitors 302 and 304, including ancillary codes read thereby and proximity/identification data stored by the monitors 302 and 304, and processes such codes and data to determine whether either monitor read any codes that the other either did not read or failed to read completely. Where the system finds such code omissions and detects that the two monitors were in close proximity when one failed to read such a code, either partially or completely, it augments the data records from such monitor by adding a copy of the code successfully read by the other monitor.

In certain embodiments, where monitors 302 and 304 detect that they are in proximity, each transmits one or more codes, or all codes, it has read to the other. Each monitor processes this received data to determine whether it has either failed to read such code or read it incompletely and augments its data records with a copy of the code received from the other monitor. In certain embodiments, either of the monitors 302 and 304 when they are in proximity, transmits a communication to the other when it has failed to read a code or read a code incompletely and the other, if it has successfully read the code, responds by transmitting the code to the monitor that has failed to read it. The latter then supplements its data records with the code received from the other monitor.

In certain embodiment, a first one of monitors 302 and 304 transmits a communication to the second one of monitors 302 and 304 indicating that it has read or is reading a code i9n received media data. If the second monitor receiving such communication either has not read a code or detects that it has failed to read all or a portion of a code (for example, based on the codes or portions its has been able to receive), it transmits a responsive communication to the first monitor indicating this. The first monitor responds to this communication from the second monitor by transmitting a further communication including all or a portion of the codes it has read. Upon the receipt of such further communication the second monitor augments its data records to add the omitted data.

Each of monitors 302 and 304 stores the codes it has read with time data indicating the times (on a relative or conventional time scale) at which the codes were received and/or read. Such time data may also include the date. In certain embodiments, the processor 14, 32, 40 or 210 produces the time data using an internal time data source. In certain embodiments, the time data is produced by a time data source 330 coupled with the processor 14, 32, 40 or 210 to provide the time data thereto.

In certain embodiments, the monitors 302 and 304 are synchronized by transmitting time data to the other. In certain ones of such embodiments, both transmit such time data, while in certain ones of such embodiments only one of monitors 302 and 304 transmits such time data. When either or both of monitors 302 and 304 receives such time data from the other, it compares the received time data to its own time data to determine any offset therebetween and stores this offset. When the monitor 302 or 304 receives a code or codes from the other, it also receives the time data from the other associated with such code or codes, and adjusts the received time data with the offset to synchronize the received codes with its own time data. In this manner the monitor receiving a code or codes from the other is able to match the received code or codes with any it has read partially or failed to read in order to augment its records with the received code or codes to complete any codes it has read partially or add any it failed to read. Where the monitors 302 and 304 are already synchronized to a reference source and are able to maintain such synchronization within an acceptable tolerance, it is possible to forego such time data exchange. However, where a device such as PUA 27, cellular telephone 38 or PDA 200 is employed as monitor 302 or 304, its time data may differ substantially from that of the other, so that synchronization as described hereinabove is preferred.

In certain embodiments, three or more monitors detect their proximity in the same manner as monitors 302 and 304 by communicating presence data along with respective identification data and transmit codes to augment the records of one or more of the monitors in the same fashion. Various techniques are known for minimizing or preventing data collisions in the wireless ad hoc networks that may be employed in the foregoing embodiments, for example, by using respectively different transmission delays and collision detection techniques or by means of frequency division, time division or code division multiplexing communications techniques (as used, for example, in Bluetooth, ZigBee and WiFi communications).

In certain embodiments, time synchronization of codes read by two or more monitors is carried out by a processor, such as processor 25 of system 21, a data collection server or a processor in a household, that receives the data of the monitor that failed to read the code or codes and the data from the one or more other monitors. In certain ones of such embodiments, time data received from the monitors representing one or more events for which system time was also recorded, is compared by the processor with the recorded system time for such event or events, to determine any offsets therebetween. Such events may comprise docking times, data uploading or downloading times, or other timed events commonly recorded by the monitors and by any system synchronized to system time. The determined offsets are applied to the data received from the monitors to synchronize their time data with system time to enable matching of data received from the various monitors and to add corresponding codes to the received data as appropriate where correspondence data (for example, data indicating proximity of the monitors) indicates that they received the same media. In certain ones of such embodiments, the processor accesses data for the monitors representing times at which they were synchronized with system time along with data representing time or clock frequency drift data of the respective monitors. The processor then processes this data to determine any offsets of the time data from the monitors from system time to synchronize their code data.

Omitted codes are recovered in certain embodiments using codes and associated time stamps received from broadcasters, cablecasters, satellite media distributors and other media providers. In such embodiments, the processor (such as processor 25 of system 21, a data collection server or a processor in a household) synchronizes such codes with those received from one or more monitors (either by synchronizing both to system time or synchronizing the codes from the monitors with those received from a broadcaster, cablecaster or other media provider), and augments the code data received from the monitors with that received from a media provider to provide missing codes or portions thereof.

In certain embodiments, in place of, or in addition to time synchronization as described hereinabove, a monitor that has failed to read an ancillary code in its entirety and receives a corresponding data set from one or more other monitors, matches its decoded data with the data received from the one or more other monitors to determine a time offset therebetween or to determine which of the data received from the one or more other monitors corresponds in time with the codes it failed to read in whole or in part. Once such a match has been determined by the receiving monitor, it augments its data with that received from the one or more other monitors either by applying the determined time offset to the data received therefrom or by inserting the matching data as needed to complete its own data. In certain ones of such embodiments, such matching operation is carried out by correlating the symbol stream that the receiving monitor has successfully read in part with a symbol stream received from the one or more other monitors. In certain ones of such embodiments, the receiving monitor matches the data received from the one or more other monitors by matching one or markers included in its data with one or more markers in the data received from the one or more other monitors. The marker or markers so used may be one or more of marker symbols included in the respective data and start and end points for respectively different ancillary codes included in the data. In certain embodiments, such matching is carried out by a processor, such as processor 25 of system 21, that receives the data of the monitor that failed to read the code or codes and the data from the one or more other monitors. In certain ones of such embodiments, the processor carries out such matching based also on a similarity of time stamps in such data with or without additional data indicating that the monitors were in proximity during a corresponding time period or time. In certain embodiments, the matching process is carried out by a processor in a household that receives the data from such monitors (for example, from monitors carried by two or members of the same household), or by a data collection server that receives such data. Such embodiments enable distributed processing for supplying omitted codes.

In a further application, time data associated with code data received from the various monitors is synchronized with system time to correct inaccuracies in such time data, with or without also augmenting codes omitted from the code data, using any of the time synchronization techniques described hereinabove. In certain embodiments, the time data is corrected at a centralized processing facility, at one or more data collection servers, at one or more processors in a household or in the monitors themselves using any one or more of such synchronization techniques. Such synchronization techniques are particularly useful where devices such as PUA 27, cellular telephone 38 or PDA 200 are employed as monitors, since their internal clocks are often inaccurate so that their time data may differ substantially from system time.

In certain embodiments, both time data of the monitors and system time are synchronized by reference to widely available timing data from a source external to the research data gathering system. Appropriate external sources include terrestrial facilities that provide sufficiently accurate timing data, such as the WWVB, WWV and WWVH radio stations operated by the United States National Institute of Standards and Technology (NIST), the NIST Internet Time Service, timing data supplied by telecommunications systems, such as landline and mobile telephone services and Internet services, and satellite transmitted timing data, such as that included in the data transmitted by Global Positioning System (GPS) satellites.

Each of the monitors comprises an internal clock operative to produce internal clock data, an input operative to receive the widely available timing data from such an external source and a processor coupled with the internal clock and the input to receive the internal clock data and the widely available timing data and configured to adjust the internal clock data based on the widely available timing data. In various monitors, the internal clock comprises an oscillator providing an output sufficiently stable in frequency, such as a crystal controlled oscillator or an oscillator control by another stable frequency regulating device (for example, a SAW device or silicon resonator). In certain embodiments, the input comprises a radio frequency {RF} receiver configured to receive accurate timing data from an RF transmitter such as one of radio stations WWVB, WWV and WWVH or from a GPS satellite. The use of a GPS receiver in a monitor for this purpose provides the additional benefit of location data enabling tracking of the location of the monitor by means of latitude and longitude coordinates supplied by the GPS receiver and stored by the monitor with its other data records for communication to a system processing facility. In stationary monitors, such as set top monitors and desktop personal computers, a further option is the use of widely available timing data via the Internet. Such data may also be employed in portable devices having internet access, such as PDA's and cellular telephones. In devices such a mobile telephone devices having access to a telecommunications service, accurate timing data provided by such a system may also be used.

The research data gathering system also comprises a processing facility configured to process research data gathered by the plurality of research data gathering devices. The processing facility comprises a system clock operative to produce system clock data for the research data gathering system, an input coupled to receive the widely available timing data and a processor coupled with the internal clock and the input to receive the system clock data and the widely available timing data and configured to adjust the system clock data based on the widely available timing data. The system clock comprises an oscillator providing sufficiently stable timing data for use system-wide. The input, whether an RF receiver, Internet connection, telephone connection or other source of widely available timing data, receives the same timing data as received by the inputs of the various monitors of the system, for synchronizing the system clock and the internal clocks of each of the monitors.

Although various embodiments have been described with reference to a particular arrangement of parts, features and the like, these are not intended to exhaust all possible arrangements or features, and indeed many other embodiments, modifications and variations will be ascertainable to those of skill in the art.

What is claimed is:

1. An apparatus to process research data gathered by monitoring devices, the apparatus comprising:
   processor circuitry to:
      generate message data by supplementing first information collected by a first monitoring device with second information collected by a second monitoring device, the first information and the second information collected from media presented by a monitored device; and
      process the message data to determine a first portion of the media that is encoded and a second portion of the media that is unencoded; and
   a memory to:
      store an indication that the message data is valid when the message data represents a code encoded in the media; and
      store data indicating the first portion of the media that is encoded.

2. The apparatus of claim 1, wherein the processor circuitry is further to determine that the first information collected by the first monitoring device corresponds to the second information collected by the second monitoring device based on at least one of timing information, location information, or monitoring device proximity information.

3. The apparatus of claim 1, wherein the processor circuitry is further to determine a time interval at which the media is encoded based on the first portion of the media that is encoded.

4. The apparatus of claim 1, wherein the first monitoring device and the second monitoring device are located at a same media presentation location of the monitored device.

5. The apparatus of claim 1, wherein at least one of the first monitoring device or the second monitoring device is to be worn or carried by people.

6. The apparatus of claim 1, wherein the processor circuitry is further to generate a report of media exposure based on the first portion of the media that is encoded.

7. The apparatus of claim 1, wherein the processor circuitry is further to supplement the first information with the second information by providing elements of the second information to corresponding portions of elements omitted from the first information.

8. The apparatus of claim 1, wherein the message data indicates that the first information matches at least one of the second information or the data stored in the memory.

9. One or more storage devices comprising instructions that, when executed, cause a processor circuitry to at least:
   generate message data by supplementing first information collected by a first monitoring device with second information collected by a second monitoring device, the first information and the second information collected from media presented by a monitored device;
   store an indication that the message data is valid when the message data represents a code encoded in the media;
   process the message data to determine a first portion of the media that is encoded and a second portion of the media that is unencoded; and
   store data in a database indicating the first portion of the media that is encoded.

10. The one or more storage devices as defined in claim 9, wherein the instructions further cause the processor circuitry to determine that the first information collected by the first monitoring device corresponds to the second information collected by the second monitoring device based on at least one of timing information, location information, or monitoring device proximity information.

11. The one or more storage devices as defined in claim 9, wherein the instructions further cause the processor circuitry to determine a time interval at which the media is encoded based on the first portion of the media that is encoded.

12. The one or more storage devices as defined in claim 9, wherein the instructions further cause the processor circuitry to generate a report of media exposure based on the first portion of the media that is encoded.

13. The one or more storage devices as defined in claim 9, wherein the instructions further cause the processor circuitry to supplement the first information with the second information by providing elements of the second information to corresponding portions of elements omitted from the first information.

14. The one or more storage devices as defined in claim 9, wherein the message data indicates that the first information matches at least one of the second information or the data stored in the database.

15. A method for processing research data gathered by monitoring devices, the method comprising:
   generating message data by supplementing first information collected by a first monitoring device with second information collected by a second monitoring device, the first information and the second information collected from media presented by a monitored device;
   when the message data represents a code encoded in the media, storing an indication that the message data is valid;
   processing the message data to determine a first portion of the media that is encoded and a second portion of the media that is unencoded; and
   storing data in a database indicating the first portion of the media that is encoded.

16. The method of claim 15, further including determining that the first information collected by the first monitoring device corresponds to the second information collected by the second monitoring device based on at least one of timing information, location information, or monitoring device proximity information.

17. The method of claim 15, further including determining a time interval at which the media is encoded based on the first portion of the media that is encoded.

18. The method of claim 15, further including generating a report of media exposure based on the first portion of the media that is encoded.

19. The method of claim 15, wherein supplementing the first information with the second information includes providing elements of the second information to corresponding portions of elements omitted from the first information.

20. The method of claim 15, wherein the message data indicates that the first information matches at least one of the second information or the data stored in the database.

21. The apparatus of claim 1, further including instructions that are to be executed by the processor circuitry to generate the message data and to process the message data.

\* \* \* \* \*